(12) United States Patent
Hagenmaier, Jr. et al.

(10) Patent No.: US 8,278,875 B2
(45) Date of Patent: Oct. 2, 2012

(54) SAFETY SUPERVISORY MODULE OF AN ELECTRIC VEHICLE CHARGING STATION

(75) Inventors: Carl F. Hagenmaier, Jr., Los Altos, CA (US); Charles R. Geber, Los Gatos, CA (US); Craig T. Matsuno, San Jose, CA (US); David Baxter, Monte Sereno, CA (US); Gary Eldridge, San Jose, CA (US)

(73) Assignee: Coulomb Technologies, Inc., Campbell, CA (US)

( * ) Notice: Subject to any disclaimer, the term of this patent is extended or adjusted under 35 U.S.C. 154(b) by 301 days.

(21) Appl. No.: 12/780,766

(22) Filed: May 14, 2010

(65) Prior Publication Data

US 2011/0279082 A1 Nov. 17, 2011

(51) Int. Cl.
*H01M 10/46* (2006.01)
(52) U.S. Cl. ..................................... 320/109
(58) Field of Classification Search .................. 320/104, 320/107, 109, 134, 136; 361/8, 622, 626; 702/63, 64, 65
See application file for complete search history.

(56) References Cited

U.S. PATENT DOCUMENTS

| 4,845,419 A * | 7/1989 | Hacker .................... 320/136 |
| 2010/0065627 A1* | 3/2010 | Outwater .................. 320/109 |
| 2010/0228405 A1* | 9/2010 | Morgal et al. .............. 320/107 |

* cited by examiner

*Primary Examiner* — Edward Tso
(74) *Attorney, Agent, or Firm* — Blakely, Sokoloff, Taylor & Zafman LLP

(57) ABSTRACT

A safety supervisory module (SSM) of an electric vehicle charging station that controls flow of current from the electric vehicle charging station to an electric vehicle. The SSM includes a set of two or more processors to control operation of a contactor control circuitry of the SSM to open and close a set of contacts of a set of power supply lines to control flow of current from the charging station to an electric vehicle. Each processor independently determines whether an unsafe condition exists and asserts a relay enable signal to the contactor control circuitry only when an unsafe condition does not exist. The contactor control circuitry generates a current to energize a relay to close the set of contacts responsive to the relay enable signal being asserted by each and every processor of the set of processors, and inhibits closure of the set of contacts or opens the set of contacts to prevent electricity from flowing between the charging station and an electric vehicle when any of the set of processors is not asserting the relay enable signal.

22 Claims, 24 Drawing Sheets

SAFETY SUPERVISORY MODULE OF AN ELECTRIC VEHICLE CHARGING STATION

BACKGROUND

1. Field

Embodiments of the invention relate to the field of charging stations for electric vehicles; and more specifically, to a safety supervisory module of an electric vehicle charging station.

2. Background

Electric vehicle charging stations connect electric vehicles (e.g., electric battery powered vehicles, plug in hybrid electric vehicles, etc.) to the electric power supply network for the purpose of charging batteries (or other electrical storage devices) of electric vehicles. The charging stations may be configured for level one charging and/or level two charging. In level one charging, the charging station includes a standard electrical receptacle to accept charging cords for electric vehicles (e.g., conforming to NEMA standards 5-15, 5-20, 14-50 or other standards (e.g., BS 1363, CEE7, etc.)) and typically charges at 16 amps or less. In level two charging, the charging station includes dedicated supply equipment and has either a fixed charging cord where one end is terminated and secured at the charging station or has an electrical receptacle (e.g., conforming to one of the following standards: SAE J1772, IEC 62196-2, and IEC 60309) that allows the charging cord to be plugged and unplugged from the charging station. The other end plugs into on-board charging circuitry of an electric vehicle. In level two charging, the maximum current is typically 80 amps or less. In level two charging, a control pilot signal is sourced by the charging station and, among other things, verifies whether an electric vehicle is properly connected and is ready to accept energy.

Electric vehicle charging stations commonly are required to comply with safety regulations and standards since a dangerous amount of current may be transferred. For example, UL 2231-2 is a standard for electric vehicle supply circuits and protecting devices for use in the charging systems. UL 2231-2 requires that a supervisory circuit exist in the electric vehicle supply equipment that allows for the periodic testing of a ground fault circuit through use of a simulated ground fault, or automatically testing the system prior to each operation. The tests must also include determining whether the contacts are fused closed or shut.

SUMMARY

A safety supervisory module (SSM) of an electric vehicle charging station is described. The SSM performs a number of safety-related functions to ensure safe operating of the electric vehicle charging station including controlling the flow of current from the charging station to an electric vehicle. In one embodiment, the SSM, which is installed in a charging station, controls the current-carrying conductors of the charging station (e.g., the contacts that complete the circuit to power supply lines) that allow the transfer of energy between the charging station and the electric vehicle (including transfer of energy to a power grid from the electric vehicle in a Vehicle to Grid (V2G) environment). For example, the SSM includes contactor control circuitry that generates current outputs to drive a relay to open and close the contacts. The contactor control circuitry is under instruction from a pair of redundant processors of the SSM, which each must assert a signal to indicate the contactor control circuitry to close the contacts. Both processors must be operating and be asserting the signal to close the contacts in order for the contactor control circuitry to close the contacts; however, either processor can inhibit closure of the contacts if it detects a self test failure and either of the contacts can cause the contacts to open in the event of an unsafe condition (e.g., by de-asserting the signal to close the contacts). Thus, if either of the processors fails for any reason, the contacts will be inhibited from closing if they are currently open and will open if currently closed. Thus, each processor individually and independently provides the safety-related functions of the SSM.

The SSM also includes a charge circuit interrupting device (CCID) that monitors the differential current among the current-carrying conductors and interrupts the circuit (e.g., causes the contacts that complete the circuit to the power supply lines to open) when the differential current exceeds a specified nominal value. When the CCID detects a fault, it asserts a CCID fault signal to each of the processors. Upon either of the processors detecting an asserted CCID fault signal, the contacts will be opened (e.g., the processor(s) will de-assert the signal to close the contacts causing the contacts to open).

A self test operation is performed on the CCID prior to each use of the charging station. The self test operation verifies that the CCID will generate and assert a fault signal to the processors when sufficient differential current is applied. The self test operation also ensures that both processors witness both the asserted and de-asserted condition of the CCID fault signal. The SSM also provides automatic retry capability in certain circumstances after a fault signal has been asserted. If either of the processors detects that the self test operation has failed, the contacts will be inhibited from closing.

Thus, the redundant processors individually and independently provide the safety functions of the SSM. If either of them fails for any reason, the other processor is capable of providing each of the safety functions. Moreover, both of the processors must be operating and asserting the signal to close the contacts in order for the contacts to close, and thus for electricity to be supplied to an electric vehicle through the charging station. If either processors fails, the charging station will not be able to be used to transfer electricity to an electric vehicle.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
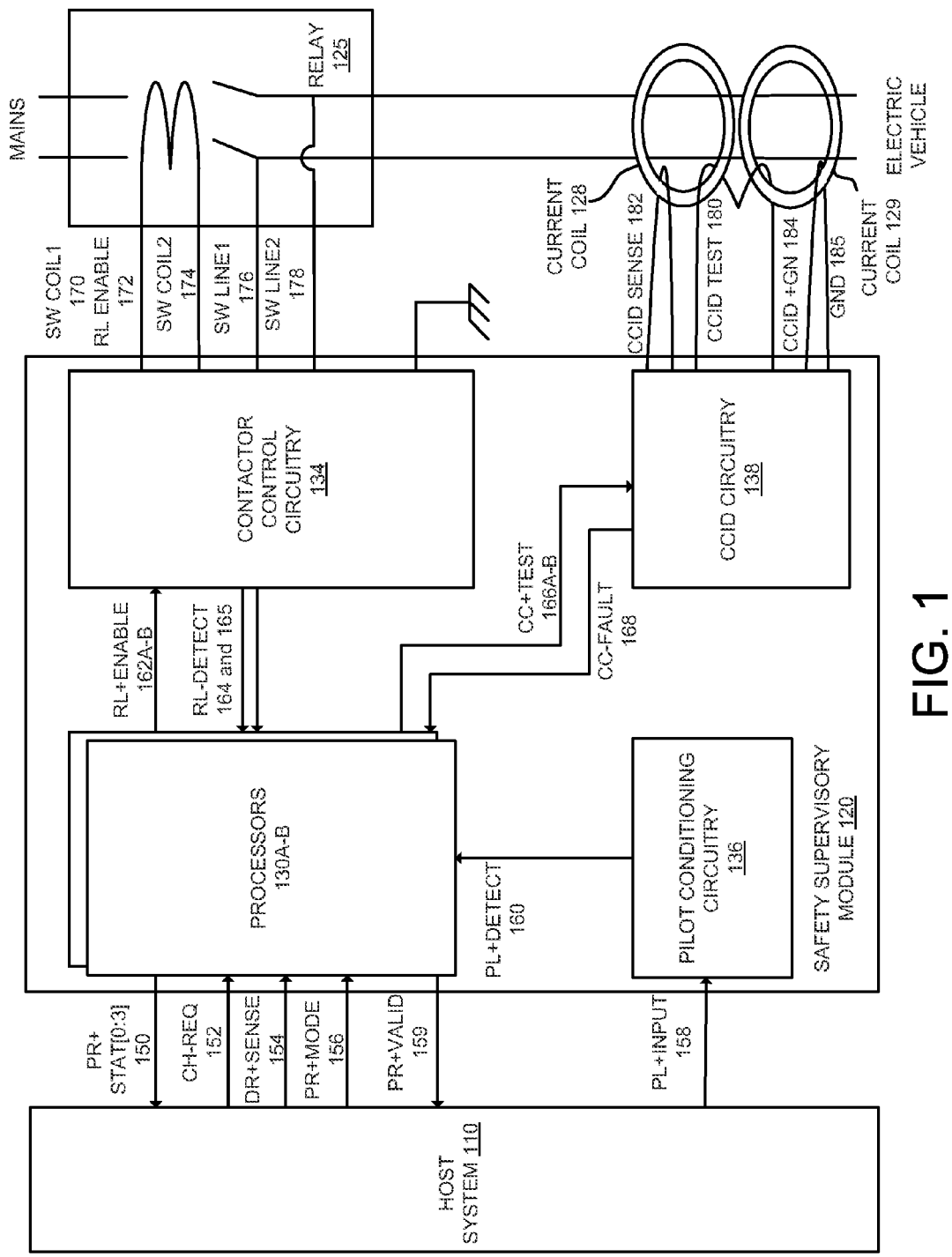
FIG. 1 illustrates an exemplary safety supervisory module (SSM) architecture according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for a safety supervisory module of an electric vehicle charging station is described. The safety supervisory module (SSM) performs a number of safety-related functions to ensure safe operating of the electric vehicle charging station ("charging station") including controlling the flow of current from the charging station to an electric vehicle. In one embodiment, the SSM, which is installed in a charging station, controls the current-carrying conductors of the charging station (e.g., the contacts that complete the circuit to power supply lines) that allow the transfer of energy between the charging station and the electric vehicle (including transfer of energy to a power grid from the electric vehicle in a Vehicle to Grid (V2G) environment). For example, the SSM includes contactor control circuitry that generates current outputs to drive a relay to open and close the contacts. The contactor control circuitry is under instruction from a pair of redundant processors, which assert a signal to indicate the contactor control circuitry to close the contacts. Both processors must be operating and be asserting the signal to close the contacts in order for the contactor control circuitry to close the contacts; however, either processor can inhibit closure of the contacts if it detects a self test failure and either of the contacts can cause the contacts to open in the event of an unsafe condition (e.g., by de-asserting the signal to close the contacts).

The SSM also includes a charge circuit interrupting device (CCID) that monitors the differential current among the current-carrying conductors and interrupts the circuit (e.g., causes the contacts that complete the circuit to the power supply lines to open) when the differential current exceeds a specified nominal value. The SSM also performs a self test operation on the CCID prior to each use of the charging station. The self test operation verifies that the CCID will generate and assert a fault signal when sufficient differential current is applied. The self test operation also ensures that both processors witness both the asserted and de-asserted condition of the CCID fault signal. The SSM also provides automatic retry capability in certain circumstances after a fault signal has been asserted.

In some embodiments, the charging station may be configured for level one charging and/or level two charging. In level one charging, the charging station includes a standard electrical receptacle to accept charging cords for electric vehicles (e.g., conforming to NEMA standards 5-15, 5-20, 14-50 or other standards (e.g., BS 1363, CEE7, etc.)) and typically charges at 16 amps. In some embodiments, the power receptacle is covered by a locking door which locks when a charging cord is inserted into the power receptacle such that the cord cannot be unplugged by an unauthorized user. The charging station may sense the position of the door and the SSM may not allow charging when the door is not properly closed and locked. In some embodiments, the locking door is a dual position locking door such as described in U.S. patent application Ser. No. 12/177,062, filed Jul. 21, 2008, entitled "Vehicle Charging Station Having a Dual Position Locking Door," which is incorporated by reference herein.

In level two charging, the charging station includes dedicated supply equipment and either has a fixed charging cord where one end is terminated and secured at the charging station or has an electrical receptacle that allows one end of the charging cord to be plugged and unplugged from the charging station. The other end of the charging cord can be plugged into on-board charging circuitry of an electric vehicle. In level two charging, the maximum current is typically 80 amps or less. In level two charging, a control pilot signal is sourced by the charging station and, among other things, verifies whether an electric vehicle is properly connected and is ready to accept energy. The SSM does not allow current to flow to the electric vehicle unless the pilot signal signifies that the electric vehicle is properly connected and ready to accept energy.

The SSM receives two independent control inputs: one from the host system (which indicates a request to close the relay contacts) and one from the electric vehicle (the control pilot signal if operating in level two charging) or corresponding to the position of the locking door in level one charging. Both inputs must be in the proper state before the SSM will close the relay contacts. For example, in level one charging, the SSM will not close the relay contacts unless a request from the host system is asserted to close the relay contacts and the door is properly closed and locked. As another example, in level two charging, the SSM will not close the relay contacts unless a request from the host system is asserted to close the relay contacts and the control pilot signal indicates that the electric vehicle is properly connected to the charging station and is ready to accept energy.

The two redundant processors do not exchange data, however they occasionally synchronize their operations. For example, each of the processors may turn on the evident indicator, which is a light which is illuminated when a CCID fault or other error occurs, however it will blink only if both processors agree on a blinking period. An output signal common to the processors is used to set a synchronization point. When one of the processors reaches a synchronization point (e.g., when they output a status), it sets the output signal to high. The common output signal performs a wired-AND function such that the signal remains low until both processors release a high signal. Thus, when a processor sees a high signal, it knows the other processor has reached the synchronization point and released the high signal. In some embodiments, the processors do not proceed until they are synchronized.

FIG. 1 illustrates an exemplary SSM architecture according to one embodiment of the invention. As illustrated in FIG. 1, the SSM 120 includes a set of two processors 130A and 130B (e.g., PIC (Programmable Interface Controller) processors), contactor control circuitry 134, pilot conditioning circuitry 136, and CCID circuitry 138. The processors 130A-B and the pilot conditioning circuitry 136 are coupled with the host system 110. The host system 110 includes a set of hardware, software, firmware, or a combination thereof, and is responsible for such things as receiving and processing charging service requests from electric vehicle operators, processing pilot signals, generating signals for input into the processors 130A-B, illuminating the evident indicator, etc. The contactor control circuitry 134 is coupled with the relay 125 and controls the opening and closing of the contacts of the relay 125, which is described in greater detail later herein.

The processors 130A-B operate in parallel and execute the same software (which will be described in greater detail later herein), and receive the same input signals (e.g., they are on common nets on the circuit board of the SSM 120). For example, each of the processors 130A-B receive the charge request signal 152 (CH−Req), the door sense signal 154 (DR+Sense), and the processor mode signal 156 (PR+Mode) from the host system 110. Each of the processors 130A-B also receive the pilot detect signal 160 (PL+Detect) from the pilot conditioning circuitry 136, the relay detect signals 164 and 165 (RL−Detect) from the contactor control circuitry 134 (respectively corresponding to the contact for switched line 176 and the contact for switched line 178), and the CCID fault signal 168 (CC−Fault) from the CCID circuitry 138. The control outputs of the processors 130A-B are duplicated (e.g., they are separate nets on the circuit board of the SSM 120), whereas the status outputs are common and tied together on the circuit board (e.g., in a wired-AND configuration). For example, each of the processors 130A-B independently drives a relay enable signal 162A and 162B (RL+Enable) respectively to the contactor control circuitry 134 and the CCID fault test signal 166A and 166B (CC+Test) respectively to the CCID circuitry 138. The processor status signals 150 (PR+Stat[0:3]), and the processor valid signal 159 (PR+Valid) are sent to the host system 110 and are common to the processors 130A-B.

The processors 130A-B cause the contacts in the relay 125 to open and close by asserting the relay enable signals 162A-B to the contactor control circuitry 134. The contactor control circuitry 134 generates current outputs to drive the relay 125 (e.g., to close the contacts that complete the power supply lines (switched line 176 (SW Line1) and switched line 178 (SW Line2) respectively in the relay 125)) in response to each of the signals 162A-B being asserted. For example, if the relay 125 is an AC relay, the contactor control generates the switched coil1 output 170 (SW+Coil1) and switched coil2 output 174 (SW+Coil2) to create a high voltage current loop flowing through an AC relay coil of the relay 125 to close the contacts. As another example, if the relay 125 is a DC relay, the contactor control generates the relay enable output 172 to create a low voltage loop flowing through a DC relay coil of the relay 125 to close the contacts. It should be understood that current is capable of flowing when the contacts are closed and no amount of current can flow when the contacts are open.

Figure 18A:
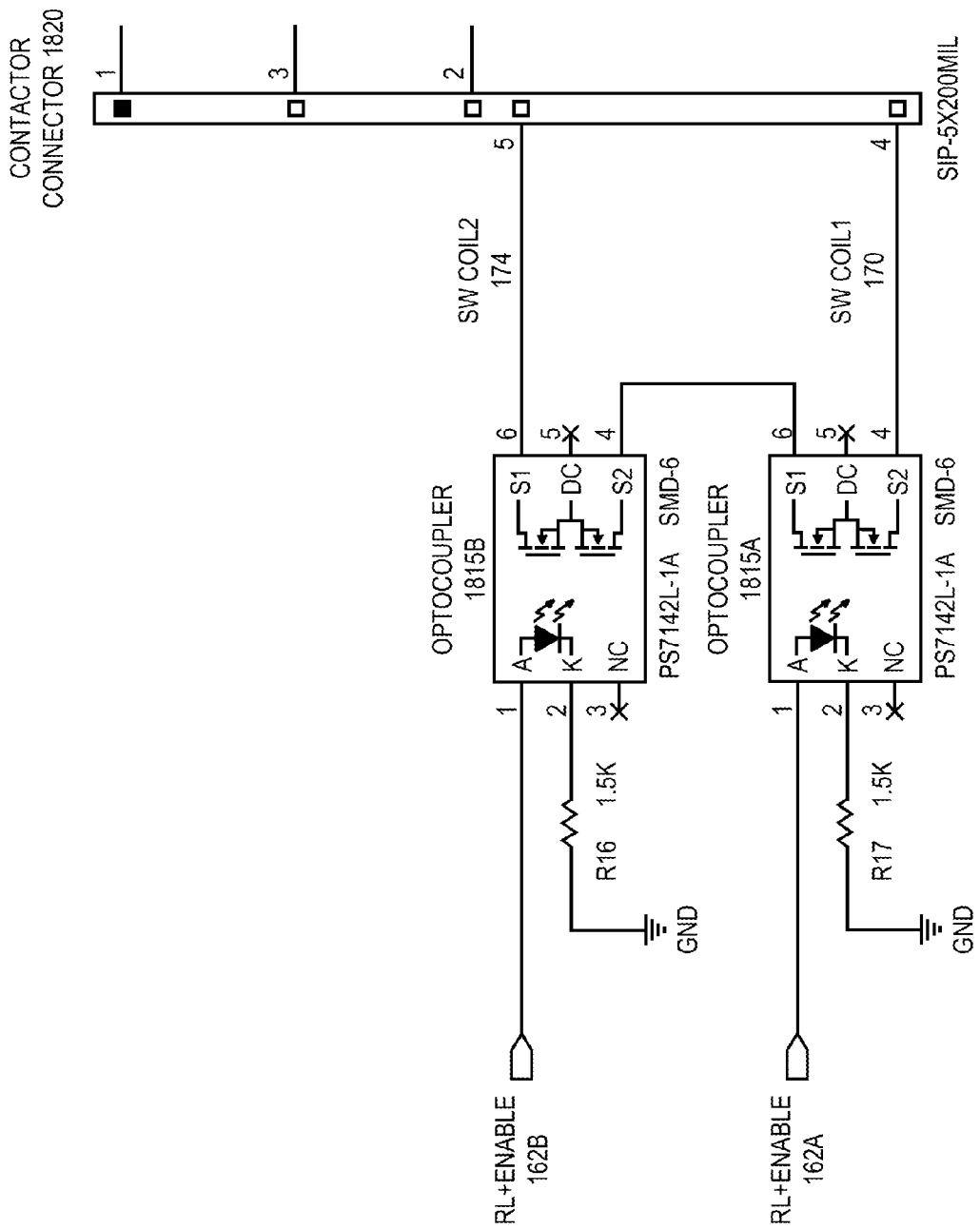
FIG. 18A-C are schematics illustrating exemplary circuitry of the contactor control circuitry of the SSM according to one embodiment of the invention.
Figure 18B:
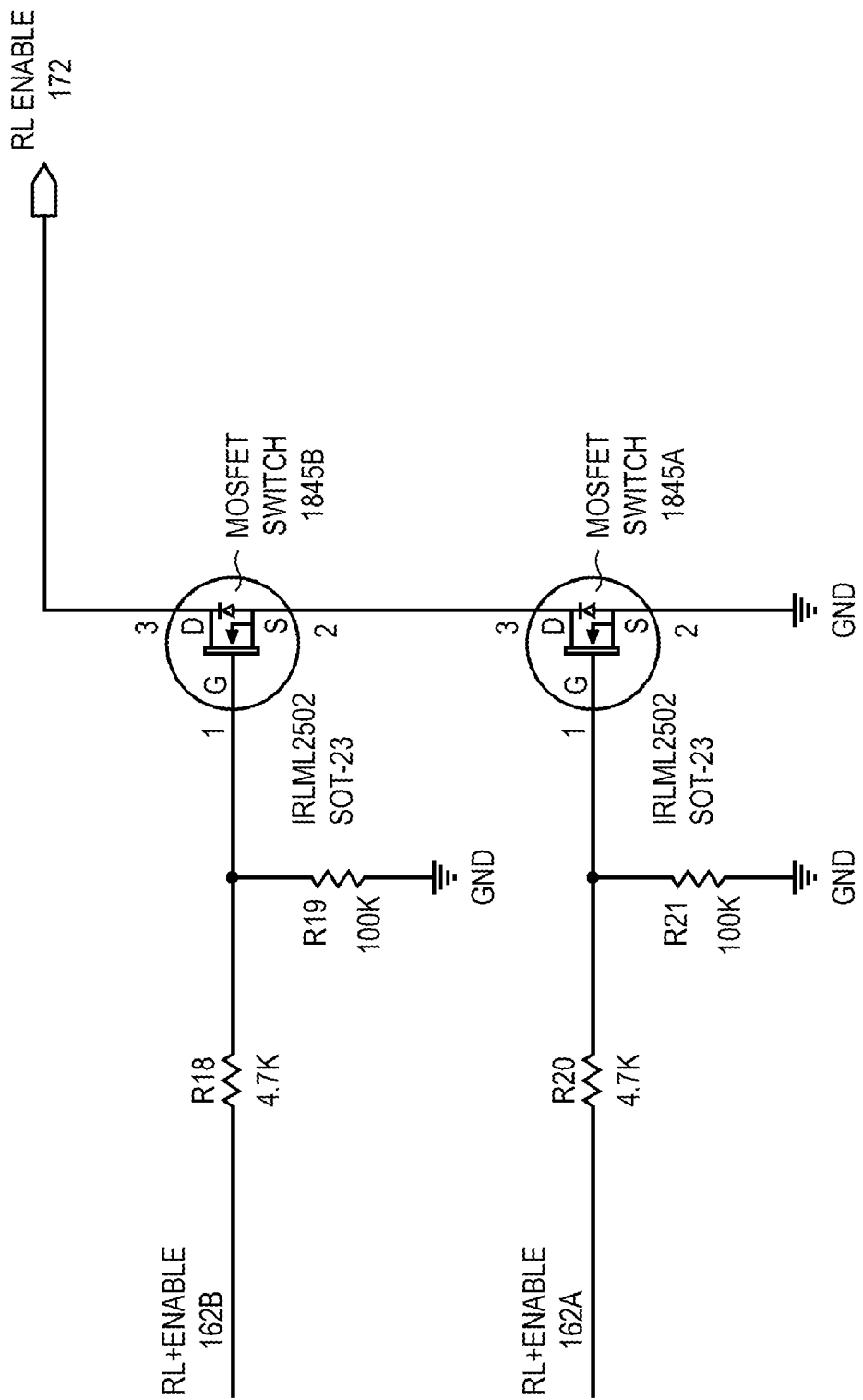
Figure 18C:
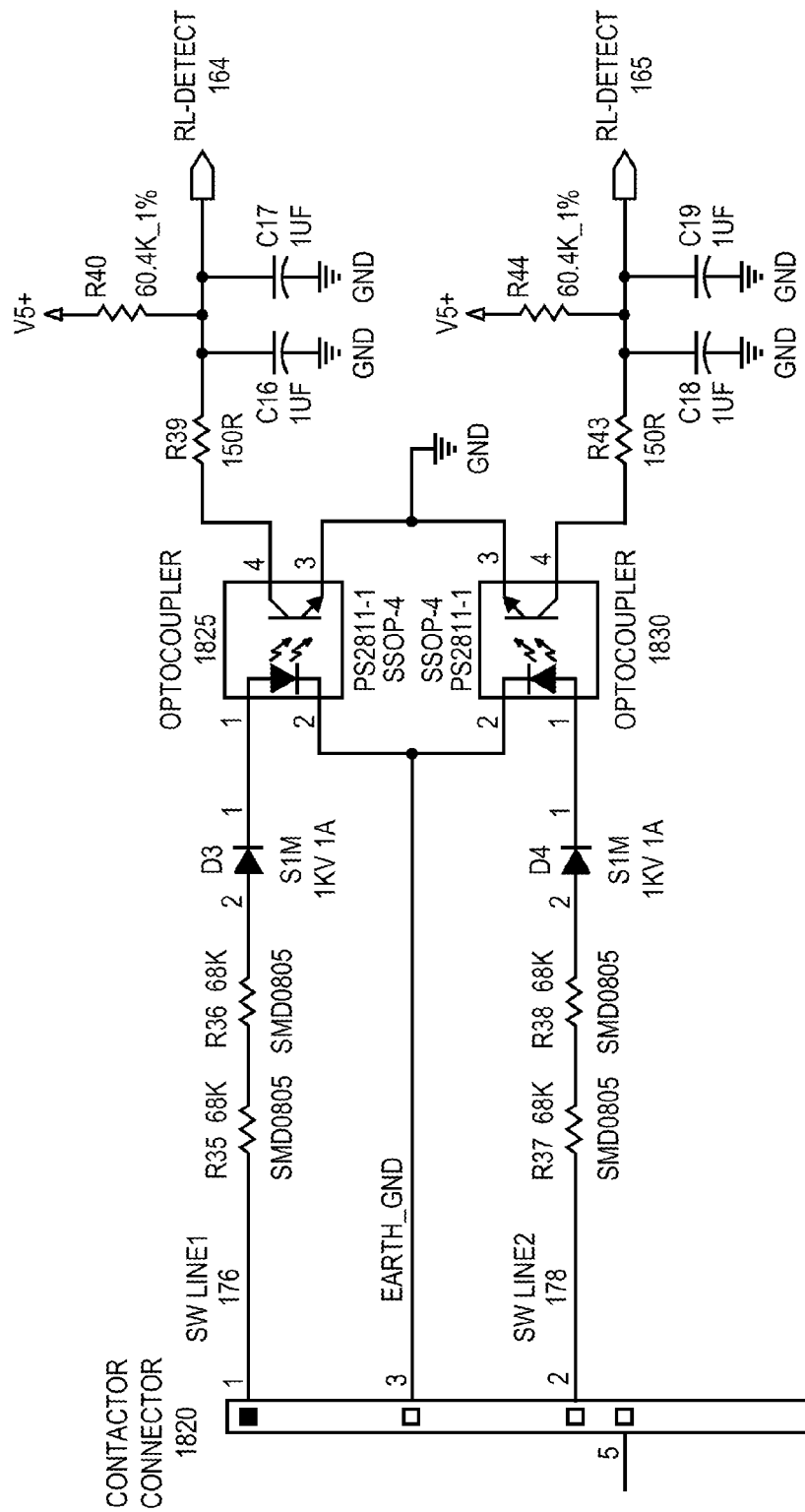

The contactor control circuitry 134 generates the current outputs to close the contacts in the relay 125 only after receiving the relay enable signals 162A and 162B from the processors 130A-B respectively. Thus, both of the processors 130A-B must be operating correctly and be asserting a relay enable signal in order for the contacts in the relay 125 to close (and thus for current to flow between the charging station and an electric vehicle), assuming that that the contacts in the relay 125 are not fused closed. In order to safeguard against using the charging station when the contacts are fused closed or otherwise stuck in the closed position, the contactor control circuitry 134 senses the position of the contacts, which will be described in greater detail later herein. An exemplary schematic of the contactor control circuitry 134 is illustrated in FIGS. 18A-C.

Although both of the processors 130A-B must assert a relay enable signal to the contactor control circuitry 134 to close the contacts, either processor can inhibit closure of the contacts (prevent the contacts from being closed) if it detects a failure during a self-test operation, and either processor can cause the contacts to open in the event of an unsafe condition (e.g., if a CCID fault occurs). For example, if the processor 130A detects a failure during self-test operation, it can cause independently cause the relay contacts to open by de-asserting the relay enable signal 162A.

The CCID circuitry 138 measures the differential current that exists in the switched lines 176 and 178. For example, the switched lines 176 and 178 run through the current coil 128. If the current is balanced (there is no differential current), then no amount of current is induced in the current coil 128. However, when there is an imbalance (there is differential current), then some amount of current begins to flow in the current coil 128. The CCID sense 182 is an analog input indicating the amount of differential current present in the two conductors as existing in the current coil 128. If the amount of differential circuit exceeds a threshold (e.g., 20 mA), the CCID circuitry 138 outputs the CCID fault signal

Figure 17A:
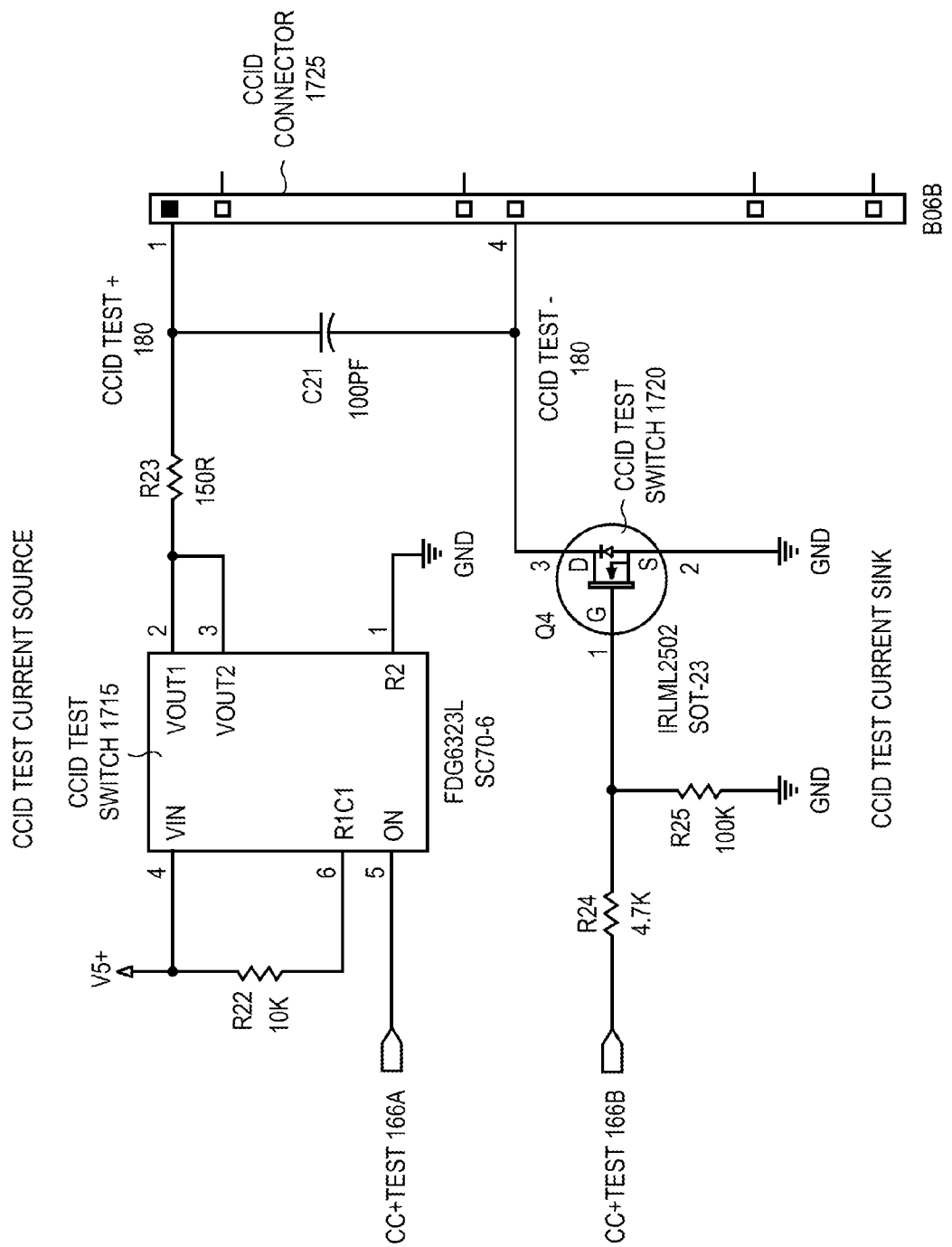
FIGS. 17A-C are schematics illustrating exemplary circuitry of the CCID circuitry of the SSM according to one embodiment of the invention.
Figure 17B:
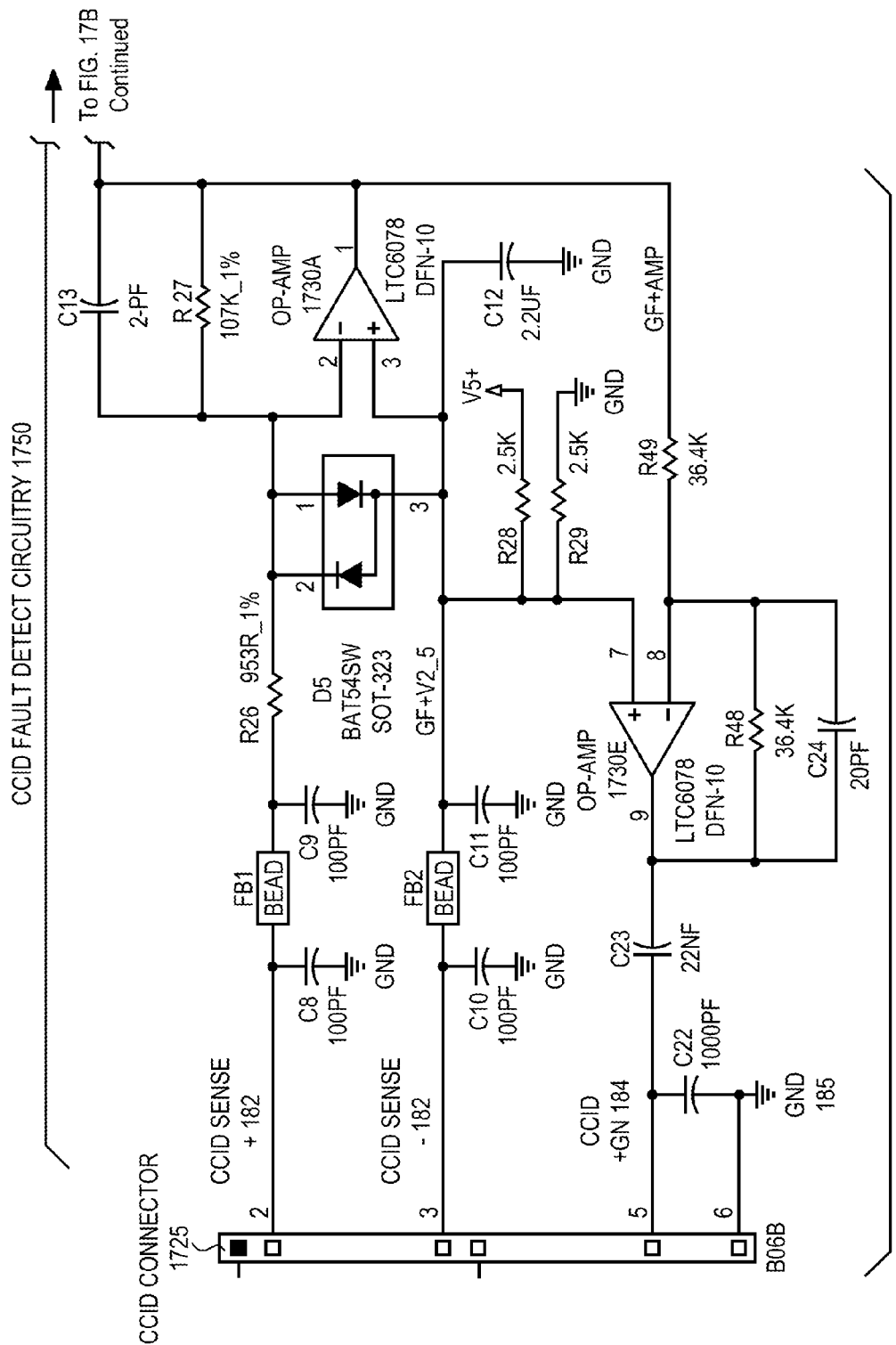
Figure 17B:
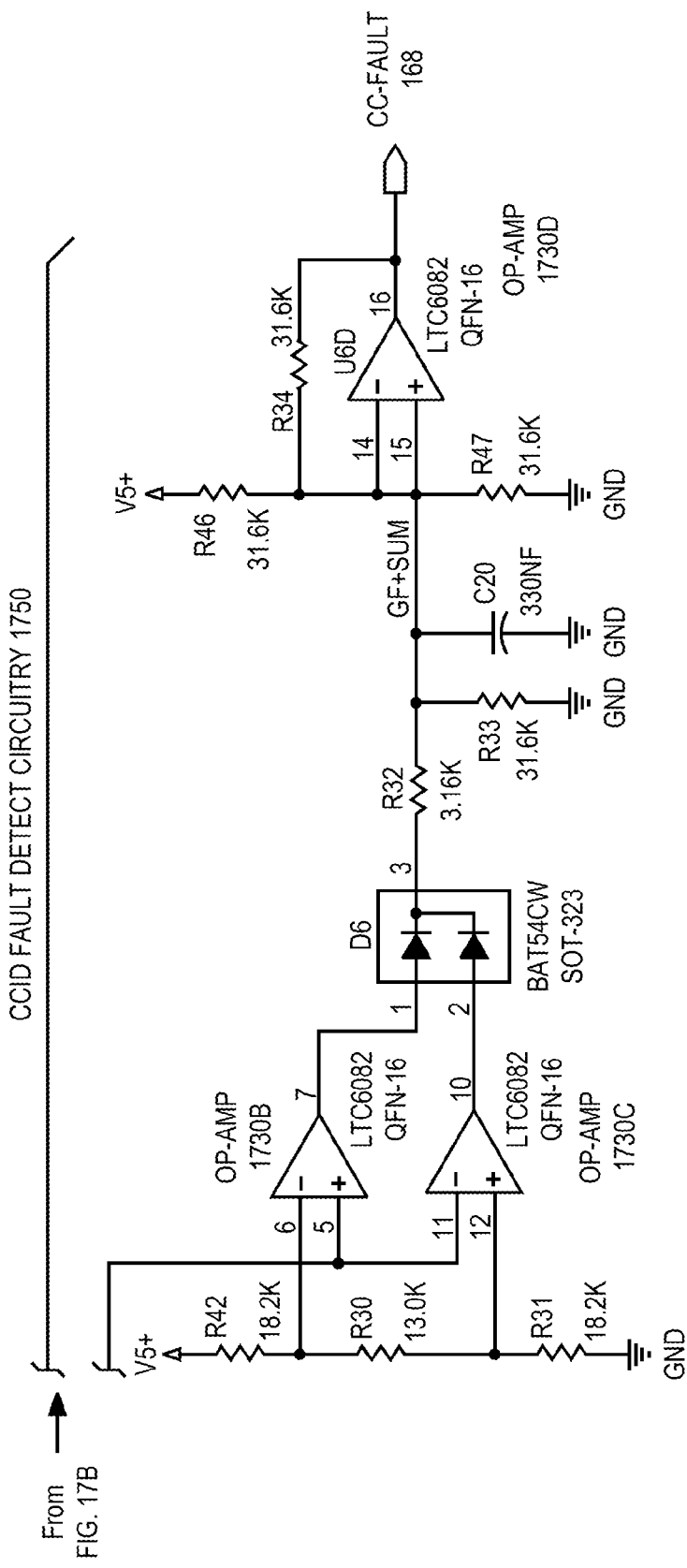

168 (CC–Fault) to the processors 130A-B. In embodiments where the charging station supports level 1 charging, the CCID circuitry 138 also detects faults with a grounded neutral. For example, the switched lines 176 and 178 run through the current coil 129. The CCID+GN 184 is a drive signal that induces equal voltages on the switched lines 176 and 178 passing through the current coil 129. If there is a neutral-ground short, current will flow through the neutral line to the ground line 185. This will lead to a current imbalance causing the CCID circuitry 138 to output the CCID fault signal 168 to the processors 130A-B. An exemplary schematic of the CCID circuitry 138 sensing differential current is illustrated in FIG. 17B.

The CCID circuitry 138 also generates a differential current used in a self test procedure. For example, the CCID test 180 is a low voltage current loop used to trigger a CCID fault during a self test. An exemplary schematic of the CCID circuitry 138 used to generate a differential current used in a self test procedure is illustrated in FIG. 17A.

Figure 14:
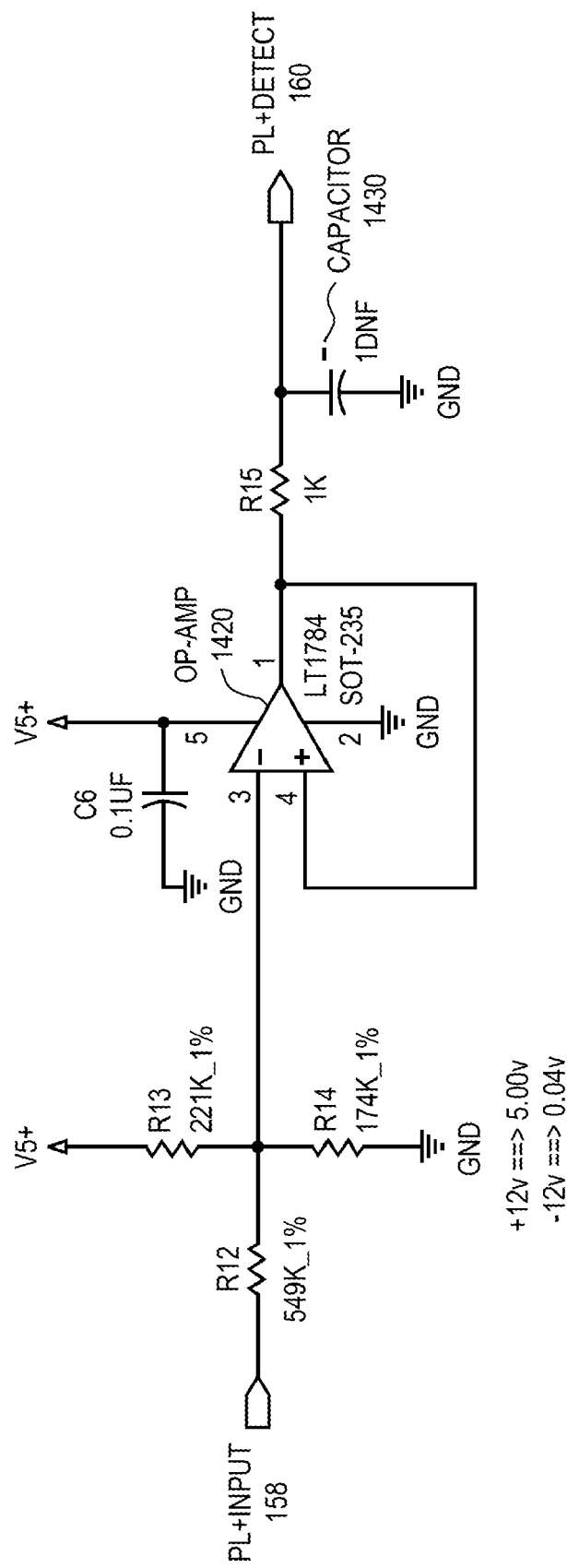
FIG. 14 is a schematic of exemplary circuitry for the pilot conditioning circuitry of the SSM according to one embodiment of the invention.

The pilot conditioning circuitry 136 converts the analog pilot input signal 158 into a form suitable for use by the processors 130A-B (the pilot detect signal 160). The pilot input signal 158 and the pilot detect signal 160 indicate the state of an electric vehicle (e.g., whether an electric vehicle is connected to the charging station and is ready to accept energy) and is used in level two charging only. An exemplary schematic of the pilot conditioning circuitry 136 is illustrated in FIG. 14.

Prior to the SSM 120 closing the contacts, the SSM 120 performs a self test procedure. The self test procedure verifies that the CCID circuitry 138 is operating correctly. As part of the self test procedure, the processors 130A-B generate a CCID fault test signal 166A and 166B respectively to the CCID circuitry 138, which responds by generating a current in wire 180 sufficient enough to cause a CCID fault (over the CCID fault threshold). It should be understood that CCID circuitry 138 generates a current in wire 180 only when the CCID fault test signals 166A and 166B are both asserted. Thus, if either of the CCID fault test signals 166A or 166B are not asserted, the CCID circuitry 138 will not generate a differential current and the self-test will fail. If the CCID circuitry 138 is operating correctly, then the differential current is sensed by the CCID circuitry 138 as a fault and is reported to the processors 130A-B.

While FIG. 1 illustrates two switched lines (and thus two corresponding contacts), embodiments of the invention are not so limited as there may be more lines and more contacts. For example, in some embodiments the charging station provides for three-phase charging that includes four switched lines and four contacts.

Figure 2:
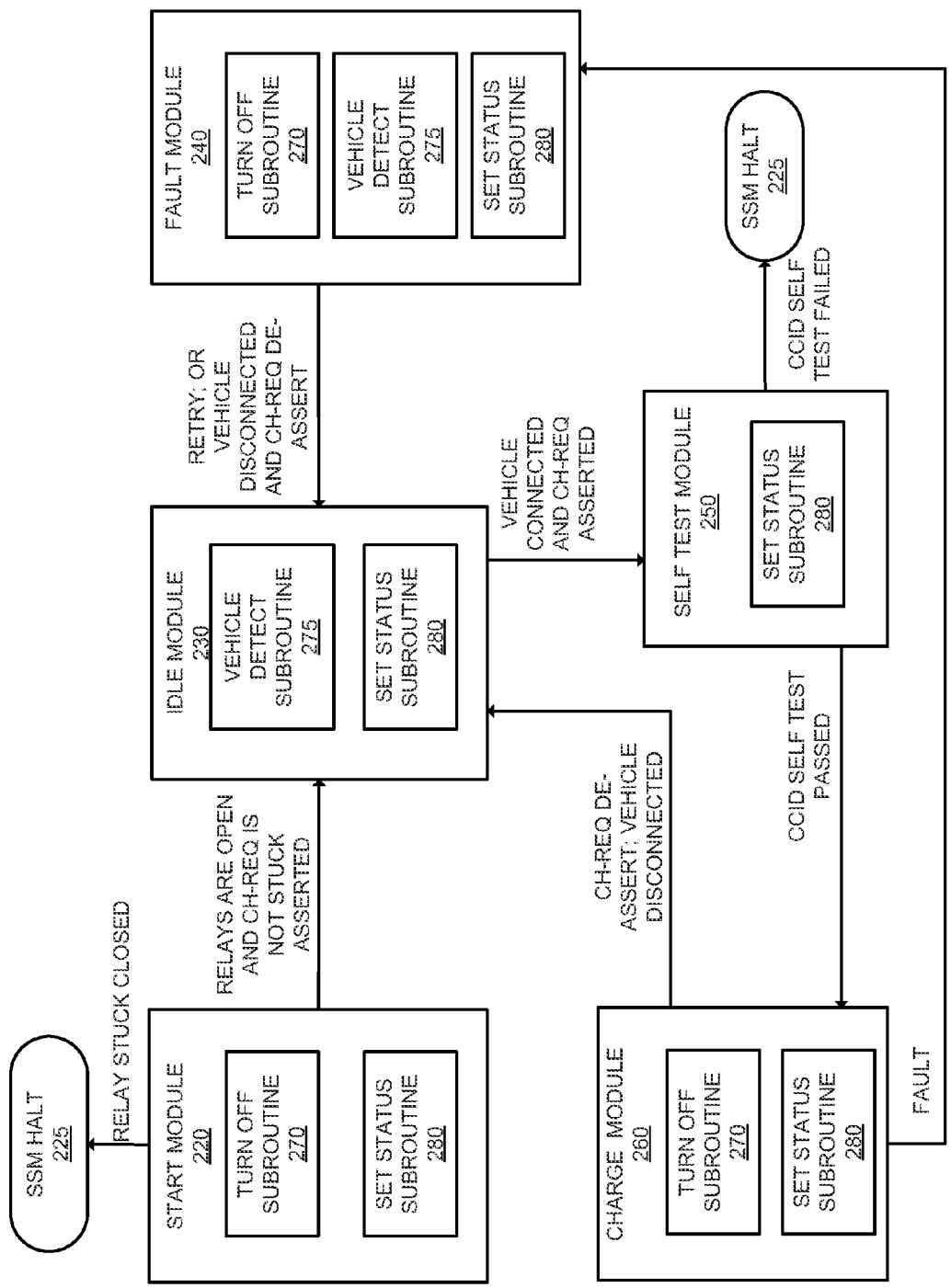
FIG. 2 is a block diagram illustrating exemplary software modules and routines executing on each of the processors of the SSM according to one embodiment of the invention.

FIG. 2 is a block diagram illustrating exemplary software modules and routines executing on each of the processors 130A-B of the SSM 120 according to one embodiment of the invention. The following description will be described with reference to the processor 130A; however it should be understood that the processor 130B performs identical operations. The operations of the flow diagrams will be described with reference to the exemplary embodiment of FIG. 2. However, it should be understood that the operations of flow diagrams can be performed by embodiments of the invention other than those discussed with reference to FIG. 2, and the embodiments discussed with reference to FIG. 2 can perform operations different than those discussed with reference to the flow diagrams.

The start module 220 executes when the charging station boots or is reset. While the start module 220 is executing, the status of the SSM 120 is set to BOOT. The start module 220 exits to the idle module 230 when there is normal operation, which occurs after it has verified that the relay contacts are open and that the charge request input signal 152 is not being asserted (which is a likely indication that that signal 152 is stuck asserted). The start module 220 also verifies that the event indicator has been on for at least some amount of time (e.g., one second) to allow the installer to verify that the indicator is working. The start module 220 can encounter two errors during operation: assertion of the charge request signal 152 and the relay contacts being stuck in the closed position (as indicated by assertion of the relay detect signals 164 and/or 165). In one embodiment, the relay contacts stuck error and/or the charge request signal assertion error causes the SSM 120 to halt 225, which requires a power cycle to reset the SSM 120. Exemplary operations performed by the start module 220 will be described in greater detail with reference to FIG. 3.

The idle module 230 monitors the charge request input signal 152 and the door sense signal 154 and/or the pilot detect signal 160. While the idle module 230 is executing, the status of the SSM 120 is set to IDLE. The idle module 230 exits to the self test module 250 during normal operation, which occurs when an electric vehicle is properly connected to the charging station (as indicated by the door sense signal 154 or the pilot detect signal 160) and the charge request input signal 152 is asserted. By exiting the idle module 230 to the self test module 250, the SSM 120 has verified that the charge request input signal 152 is not stuck as asserted. Exemplary operations performed by the idle module 230 will be described in greater detail with reference to FIG. 5.

The fault module 240 handles CCID faults. The fault module 240 handles CCID faults differently depending on when the fault occurred. For example, the fault module 240 handles faults that occur when a CCID fault occurs within a threshold amount of time after closing the relay contacts (e.g., 50 milliseconds) (sometimes referred herein as a hard fault) differently than faults that occur after the threshold amount of time (sometimes referred herein as a soft fault). Soft faults may be eligible for an automatic retry (e.g., after a 15 minute counter has been expired) for a certain number of times (e.g., three times), after which the soft fault may transition to a hard fault. Exemplary operations performed by the fault module 240 will be described in greater detail with reference to FIGS. 10, 11, and 12.

The self test module 250 verifies that the CCID circuitry 138 is operating correctly and will generate a fault signal to the processor 130A when a threshold amount of differential current exists through the switched lines 176 and 178. To verify that the CCID circuitry 138 is operating correctly, the self test module 250 causes the processor 130A to assert the CCID test fault signal 166A to the CCID circuitry 138 to cause the CCID circuitry 138 to generate differential current, which is sensed as a fault by the CCID circuitry 138 and is reported to the processor 130A. It should be understood that the CCID circuitry 138 generates a differential current only when the CCID fault test signals 166A and 168B are both asserted. The self test module 250 exits to the charge module 260 during normal operation, which occurs only after the CCID behavior has been verified (that it passes the self test). The self test module 250 can halt the SSM 120 225 if the CCID circuitry 138 is not verified. Exemplary operations performed by the self test module 250 will be described in greater detail with reference to FIG. 7.

The charge module 260 causes the relays to be energized (to close the relay contacts), verifies their operation and monitors the charge request input signal 152 and the door sense signal 154 and/or the pilot detect signal 160. When the charge request input signal 152 is de-asserted, the turn off subroutine 270 is called to cause the relay contacts to open and verify that they are open and an exit to the idle module 230 occurs. If the contacts do not close, the charge module 260 causes a relay stuck open status to be asserted and it waits for the charge request input signal 152 to be de-asserted, when it will exit to the idle module 230. If a CCID fault occurs within a threshold amount of time after closing the relay contacts (e.g., 50 milliseconds), the charge module 260 exits to the fault module 240 where it is handled as a hard fault. If a CCID fault occurs after the threshold amount of time after closing the relay contacts (e.g., 50 milliseconds), the module exists to the fault module 240 where it is handled as a soft fault. When an electric vehicle is disconnected from the charging station while charging (e.g., the vehicle operator unplugs the charging cord from the charging station and/or the electric vehicle), the charge module 260 calls the turn off subroutine 270 to cause the relay contacts to open and verify that they are open. Exemplary operations performed by the charge module 260 will be described in greater detail with reference to FIGS. 8 and 9.

The turn off subroutine 270 causes the relay contacts to be opened (if not already open) and verifies that they are open. For example, the turn off subroutine 270 causes the relay enable signal 162A to be de-asserted and evaluates the relay detect signals 164 and/or 165 to determine whether the contacts are open and closed. If the contacts are open, it returns to the calling module. If the contacts do not open (e.g., they are fused closed), then the turn off subroutine 270 halts the SSM 120. The turn off subroutine 270 is called by the start module 220, the fault module 240, and the charge module 260. Exemplary operations performed by the turn off subroutine 270 will be described in greater detail with respect to FIG. 4.

The vehicle detect subroutine 275 detects whether a vehicle is properly connected to the charging station by analyzing the door sense signal 154 (in level one charging) and the pilot detect signal 160 (in level two charging). The door sense signal 154 indicates the position of the locking door in level one charging. For example, if the signal is asserted, then a charging cord has been plugged into an electrical receptacle of the charging station and the door is properly locked, which is an indication that an electric vehicle is connected with the charging station. The pilot detect signal 160 indicates whether an electric vehicle is connected and is ready to accept energy. The vehicle detect subroutine 275 may determine the level of charging by evaluating the processor mode signal 156 (e.g., if the processor mode signal 156 is de-asserted then it is level one charging and if it asserted then it is level two charging). The vehicle detect subroutine 275 is called by the idle module 230 and the fault module 240. Exemplary operations performed by the vehicle detect subroutine 275 will be described in greater detail with respect to FIG. 6.

The set status subroutine 280 is used to set the processor status signals 150 which inform the host system 110 of the state of the SSM 120 and drives the evident indicator (whether it should be on or off). In one embodiment, the evident indicator is connected to PR+Stat[0] and illuminates responsive to that signal being asserted. The processor status signals 150 also indicate the status of the SSM 120 (e.g., Boot, Idle, Charging, Relay Stuck Open, Relay Stuck Closed, CCID Self Test Fail, CCID Soft Fault, CCID Hard Fault, Electric Vehicle Disconnected, etc.) to the host system 110. The host system 110 may respond to the state of the SSM 120 in numerous ways. For example, in case of an error (e.g., relay stuck open or closed, CCID self test fail, CCID soft or hard fault, etc.), the host system 110 may display an indication of the error; may transmit a notification message (e.g., a text message, an email, etc.) to the electric vehicle operator whose electric vehicle is being charged of the error, to the owner of the charging station, and/or to an administrator of the charging station; or any combination thereof. The set status subroutine 280 is also used to synchronize the processors 130A-B. When synchronization is achieved, the subroutine will return to the calling module.

If synchronization does not occur, the subroutine will not return, which is considered a hardware failure and a power cycle will be required to reset the SSM 120. Exemplary operations performed by the set status subroutine 280 will be described in greater detail with respect to FIG. 13.

Figure 3:
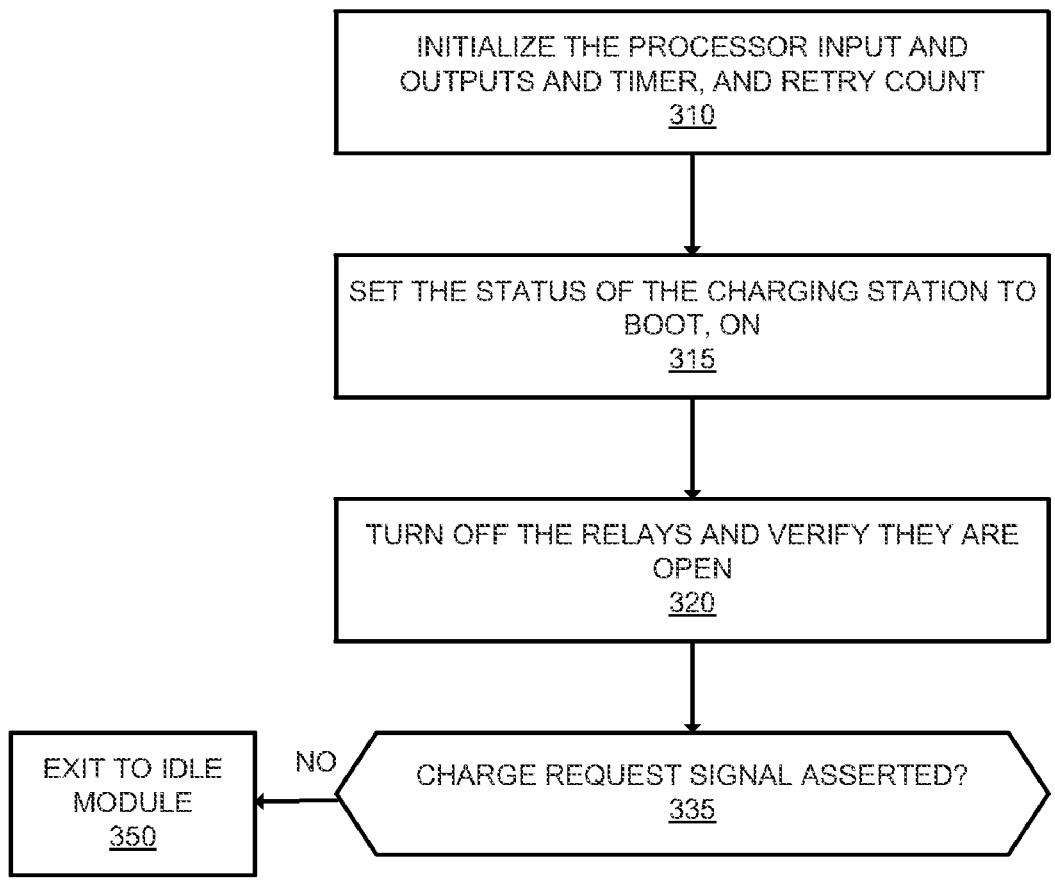
FIG. 3 is a flow diagram illustrating exemplary operations performed by the start module of the SSM according to one embodiment of the invention.

FIG. 3 is a flow diagram illustrating exemplary operations performed by the start module 220 in one embodiment. At block 310, the start module 220 initializes the processor inputs and outputs, and initializes a timer and a retry count variable (the SSM may perform an automatic CCID automatic retry (e.g., after 15 minutes) a number of times). Flow moves from block 310 to block 315 where the start module 220 sets the status of the charging station to BOOT, ON, which indicates that the state of the SSM 120 is currently at the boot stage and the evident indicator should be illuminated. To set the status, the start module 220 calls the set status subroutine 280, which is used to set the processor status signals 150 (PR+Stat[0:3]). The processor status signals inform the host system 110 of the SSM status and drive the evident indicator (e.g., an LED or other light which is illuminated when there is a CCID fault and/or other failure). Flow moves from block 315 to block 320.

Figure 4:
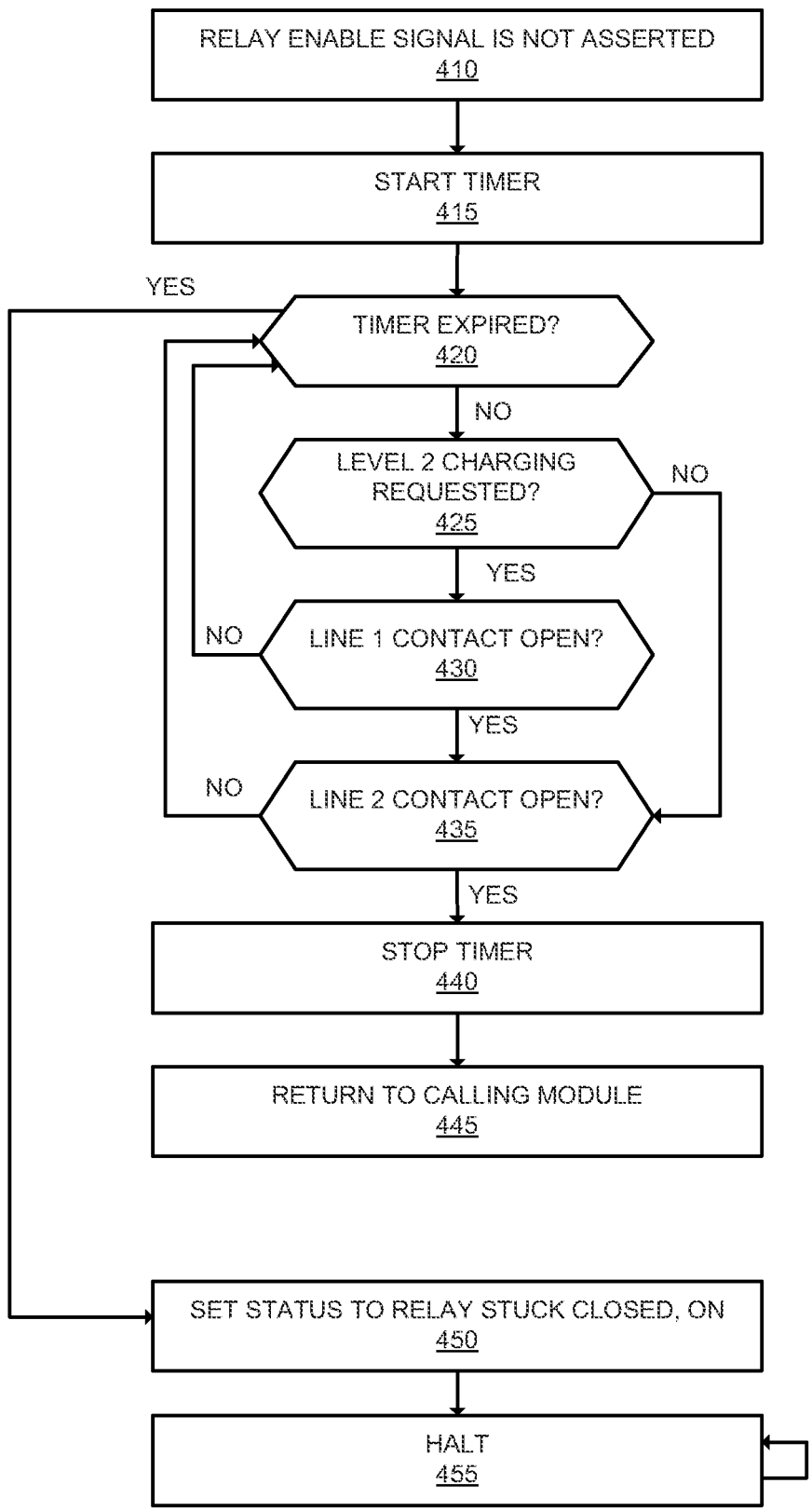
FIG. 4 is a flow diagram illustrating exemplary operations performed by the turn off subroutine of the SSM according to one embodiment of the invention.

At block 320, the start module 320 causes the relays to be turned off (the contacts to be open), if they are not already open. The start module 320 calls the turn off subroutine 270, which opens the contacts (if not already open) and verifies that they are open. FIG. 4 is a flow diagram illustrating exemplary operations performed by the turn off subroutine 270. At block 410, the relay enable signal 162A is de-asserted and/or confirmed to not be asserted by the processor 130A. Flow moves from block 410 to block 415, where a timer is started. The timer is used to allow for an amount of time for the contacts to open (e.g., three or four seconds). Flow then moves to block 420 where the subroutine determines whether the timer has expired. If the timer has not yet expired, then flow moves to block 425, where the subroutine determines whether level two charging is requested. In one embodiment, the type of charging (either level one or level two) is indicated in the processor mode signal 156 (e.g., if the processor mode signal 156 is low then it is level one charging and if the processor mode signal 156 is high then it is level two charging). If level two charging is requested, then flow moves to block 430, otherwise flow moves to block 435.

In some embodiments, the neutral contact is not sensed (but still needs to be closed in order for charging to operate). For example, to operate in level one charging or level two charging, two contacts must be closed; however in level one charging the neutral contact is not sensed. For example, as will be described in greater detail later herein, the relay detect signal corresponding to the neutral contact in level one charging (e.g., the relay detect signal 164) is ignored as there will not be sufficient voltage on the line 176 to make the relay detect signal go low. As another example, if the charging station is providing three-phase charging four lines will be switched (e.g., lines 1, 2, 3, and 4 (neutral)), where all four contacts must be closed but the neutral contact (e.g., the contact for line 4) will not be sensed.

Thus, if level two charging is requested, the turn off subroutine 270 determines whether the two contacts are open (and are thus not fused closed). At block 430, the subroutine 270 determines whether the contact for the switched line 176 is open. For example, the subroutine 270 analyzes the relay detect signal 164 to determine whether the contact for the switched line 176 is open (e.g., if the relay detect signal 164 is high the contact for the switched line 176 is open). Exemplary circuitry for determining whether a contact is open or closed will be described in greater detail with respect to FIG. 18B. If the contact is closed, then flow moves back to block 420; if the contact is open, then flow moves to block 435. At block 435, the subroutine 270 determines whether the contact for the switched line 178 is open. For example, the subroutine 270 analyzes the relay detect signal 165 to determine whether the contact for the switched line 178 is open (e.g., if the relay detect signal 165 is high, the contact for the switched line 178 is open, and if the relay detect signal 165 is low, the contact is closed). If the contact is closed, then flow moves back to block 420; however, if the contact is open, then flow moves to block 440 where the timer is stopped. Flow then moves to block 445 where the subroutine 270 returns to the calling module (e.g., the start module 220).

Referring back to block 420, when the timer expired (prior to both of the contacts being verified as open in level two charging or one contact being verified open in level one charging), flow moves to block 450 where the subroutine 270 calls the set status subroutine 280 to set the status to Relay Stuck Closed, ON (which indicates that the relays are closed, and the evident indicator should be turned on). Flow then moves to block 455 where the SSM 120 will halt (which requires a power cycle to reset the SSM 120).

Referring back to FIG. 3, if the relays are open (block 320), then flow moves to block 335. At block 335, the start module 220 determines whether a charge request is being asserted. A charge request is indicated by the charge request signal 152 asserted from the host system 110, and serves as an indication to the processor 130A to close the relay contact(s).

In some embodiments, the host system 110 asserts the charge request signal 152 responsive to authorizing a requesting electric vehicle operator (e.g., drivers of electric vehicles, passengers of electric vehicles, service personnel of electric vehicles, etc.) to use the charging station. For example, electric vehicle operators are typically required to be authorized in order to use a particular charging station. The authorization requirements may be different depending on the configuration of the charging station. For example, if a charging station is operating in open mode (available to all electric vehicle operators), authorization may include ensuring that payment for the charging service is properly authorized (e.g., using a valid credit card, valid pre-paid account with sufficient credits, valid subscription, etc.). As another example, if a charging station is operating in restricted mode, authorization may include determining whether the electric vehicle operator and/or the electric vehicle is allowed to use the charging station and may also include ensuring that payment for the charging service is properly authorized. For instance, an identifier (or a portion of an identifier) associated with the electric vehicle operator (e.g., an RFID tag associated with the electric vehicle operator communicated via an RFID device, a username/password, an email address, a phone number, an address, a credit card number, account number, PIN (personal identification number), or any other identifying information associated with the electric vehicle operator) or the electric vehicle (e.g., a VIN (vehicle identification number)), which is hereinafter referred to as an "access identifier," may be checked against a list of identifiers authorized for access (e.g., a whitelist of identifiers) and/or against a list of identifiers not authorized for access (e.g., a blacklist of identifiers). In addition, payment authorization may include determining whether a credit card is valid, whether a pre-paid account associated with the identifier has sufficient credits for the charging service, whether a subscription account associated with the identifier is in good standing, etc. While on some embodiments the charging station locally determines whether the electric vehicle operator is authorized, in other embodiments the charging station transmits an authorization request to a charging station network server to perform the authorization. In any case, after determining that the electric vehicle operator is authorized, the host system 110 asserts the charge request signal 152 to the processors 130A-B.

In some embodiments, the SSM 120 verifies that the charge request signal 152 is not asserted prior to an electric vehicle being properly connected to the charging station. For example, in level one charging, a charge request signal 152 should not be asserted unless a charging cord has been plugged into a receptacle of the charging station and a door is properly locked, which is indicated by the door sense signal 154. In level two charging, a charge request signal 152 should not be asserted unless the pilot signal (e.g., the pilot input signal 158) indicates that an electric vehicle is connected and is ready to accept energy. For example, the pilot input signal 158 indicates that an electric vehicle is connected and is ready to accept energy when the signal remains below 10.5 volts. The pilot conditioning circuitry 136 asserts the pilot detect signal 160 to the processors 130A-B when the pilot input signal 158 indicates that an electric vehicle is connected and is ready to accept energy. Accordingly, if the pilot input signal 158 indicates that the vehicle is not connected or is not ready to accept energy (and thus the pilot detect signal 160 is not asserted), and a charge request is being asserted then there is a failure of some kind, and the SSM 120 should wait until the charge request is not asserted until proceeding. Thus, if the charge request signal 152 is being asserted, flow moves to back to block 335 until the signal 152 is not asserted. However, if the charge request signal 152 is not being asserted, then flow moves to block 350 where the operations exit to the idle module 230, which will be described in greater detail with reference to FIG. 5. Thus the start module does not exit to the idle module 350 until the charge request signal is de-asserted. In an alternative embodiment, if the charge request signal is asserted, the status of the charging station is set as Self Test Fail, ON and the SSM 120 is halted, which requires a power cycle to reset the SSM 120 to continue.

Figure 5:
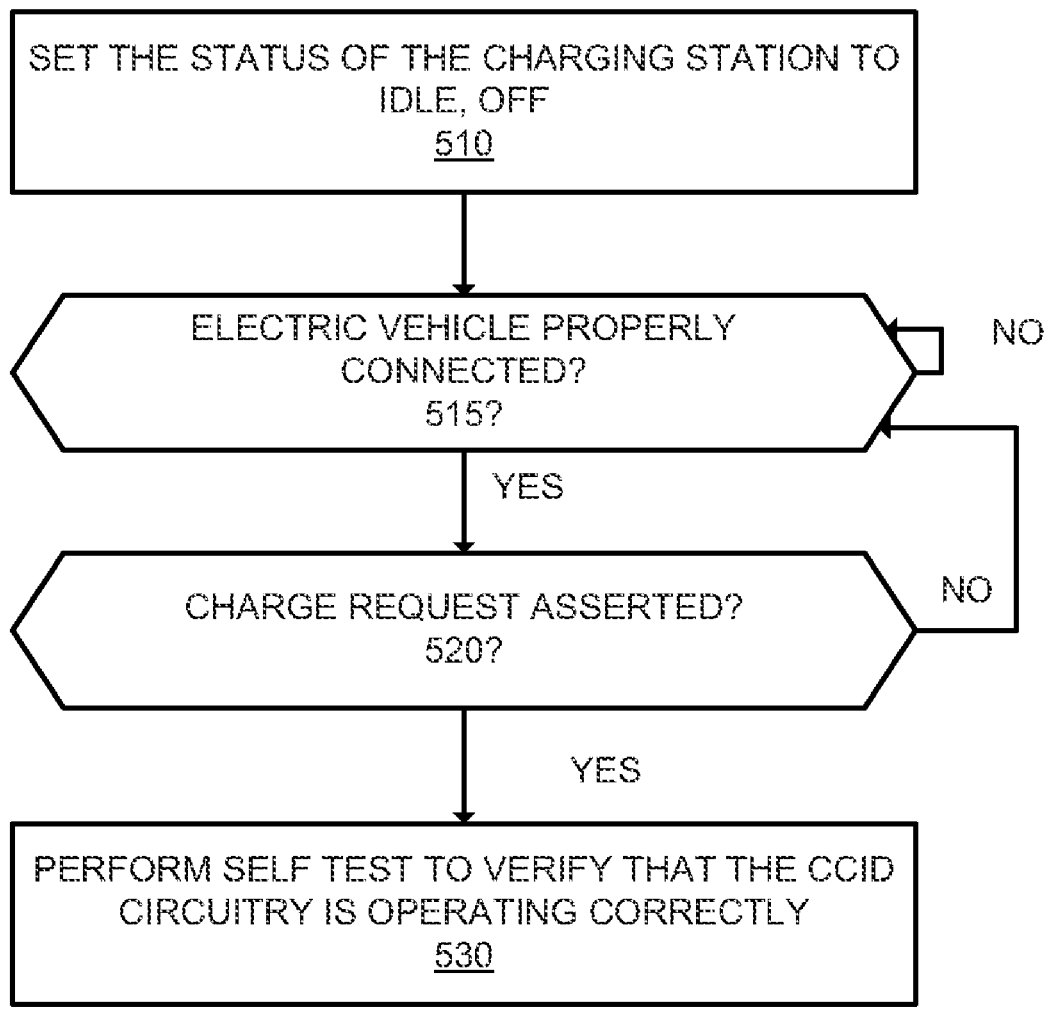
FIG. 5 is a flow diagram illustrating exemplary operations for transitioning from an idle state (where the charging station is not being used) to a self test state (where a self test procedure is performed) according to one embodiment of the invention.

FIG. 5 is a flow diagram illustrating exemplary operations for transitioning from an idle state (where the charging station is not being used) to a self test state (where a self test procedure is performed) according to one embodiment of the invention. At block 510, the idle module 230 sets the status of the charging station as idle and OFF (which indicates that the charging station is not in use and the evident indicator should be off) using the set status subroutine 280. Flow moves from block 510 to block 515, where the idle module 230 determines whether an electric vehicle is properly connected to the charging station. In one embodiment, the idle module 230 calls the vehicle detect subroutine 275 to determine whether an electric vehicle is properly connected to the charging station.

Figure 6:
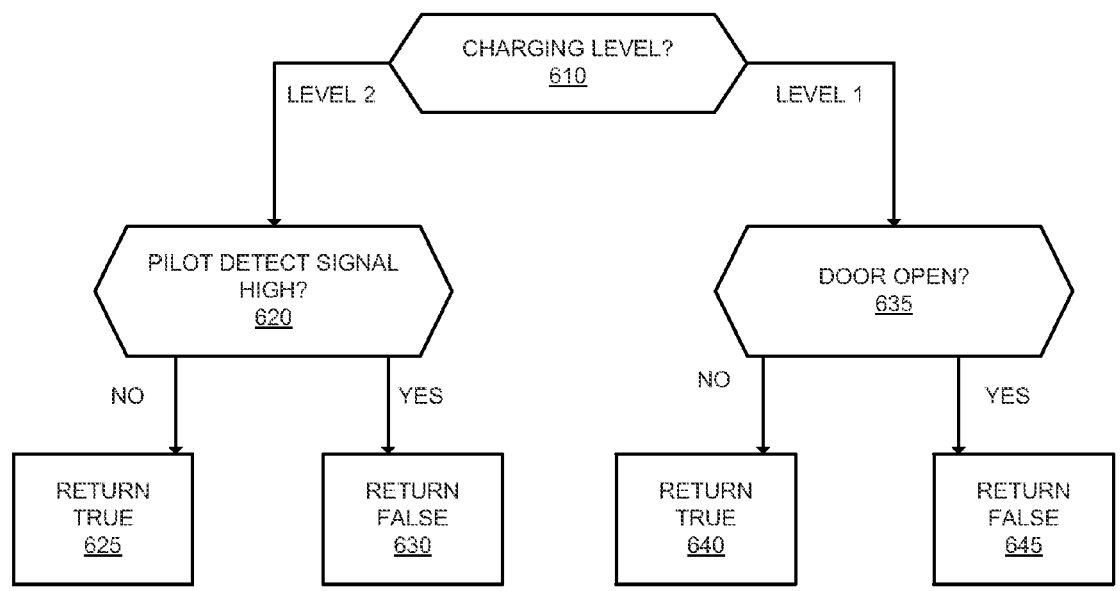
FIG. 6 is a flow diagram illustrating exemplary operations of the vehicle detection subroutine according to one embodiment.

FIG. 6 is a flow diagram illustrating exemplary operations of the vehicle detection subroutine 275 according to one embodiment. At block 610, the vehicle detection subroutine 275 determines the charging level (level one or level two charging). For example, the vehicle detection subroutine 275 analyzes the processor mode signal 156, which indicates level one or level two operation (e.g., if the processor mode signal 156 is low then it is level one charging and if the processor mode signal 156 is high then it is level two charging). If it is level one charging, then flow moves to block 635 where the vehicle detection subroutine 275 determines whether the locking door covering the electrical receptacle of the charging station is open (the door must be in a locked position in order for the processors 130A-B to cause the contacts to be closed). For example, the vehicle detection subroutine 275 analyzes the door sense signal 154, which indicates the state of the door (whether it is open or closed and locked). If the door is open, then the vehicle detection subroutine returns as false (an electric vehicle is not properly connected to the electric vehicle charging station). If the door is closed, then the vehicle detection subroutine returns as true (an electric vehicle is properly connected to the electric vehicle charging station). If the charging level indicates level two charging, flow moves to block 620 where the vehicle detection subroutine 275 determines whether the pilot detect signal 160 is high. If it is high, then flow moves to block 630 where the vehicle detection subroutine 275 returns false (an electric vehicle is not properly connected and not ready to accept energy); if it is not high, then flow moves to block 625 where the vehicle detection subroutine 275 returns true (an electric vehicle is properly connected and ready to accept energy).

Referring back to FIG. 5, if an electric vehicle is properly connected, then flow moves to block 520; otherwise flow remains at block 515. At block 520, the idle module 230 determines whether a charge request signal 152 is being asserted by the host system 110. If the charge request signal 152 is being asserted, which indicates a request from the host system 110 to close the contacts, then flow moves to block 530; otherwise flow moves back to block 515. At block 530, the idle module 230 causes a self test procedure to be performed to test whether the CCID circuitry 138 is operating correctly. In one embodiment, the idle module 230 calls the self test module 250 to perform the self test procedure. Thus, in some embodiments, the SSM 120 will perform a self test procedure on the CCID circuitry 138 when an electric vehicle is properly connected and charging has been requested, prior to closing the contacts to allow energy to flow between the charging station and the electric vehicle.

Figure 7:
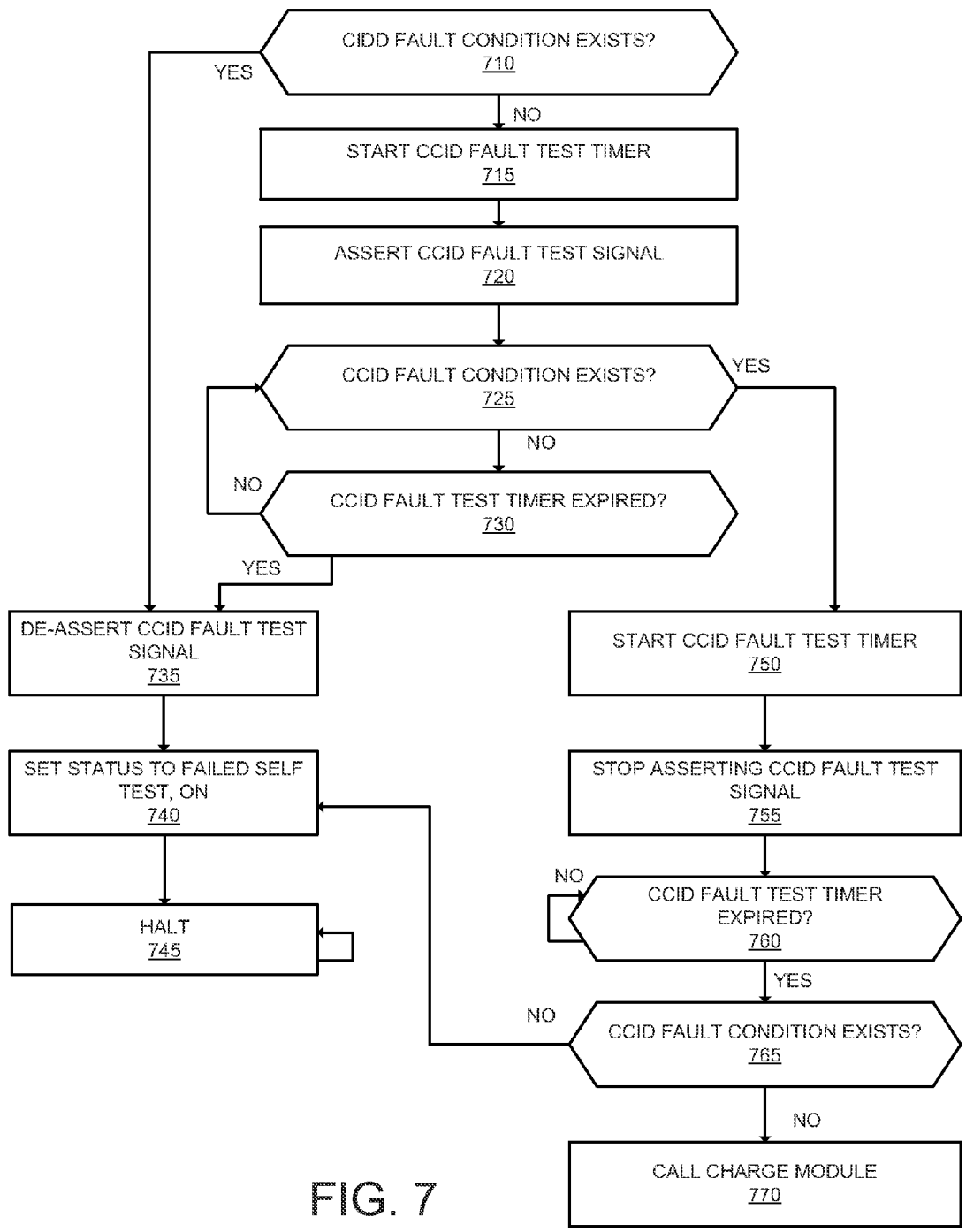
FIG. 7 is a flow diagram illustrating exemplary operations performed by the self test module of the SSM when performing a self test procedure of the CCID circuitry of the SSM according to one embodiment of the invention.

FIG. 7 is a flow diagram illustrating exemplary operations performed by the self test module 250 when performing a self test procedure of the CCID circuitry 138. At block 710, the self test module 250 determines if a CCID fault condition exists. For example, if the CCID fault signal 168 is being asserted to the processor 130A from the CCID circuitry 138, then a CCID fault condition exists. If a CCID fault condition exists, then flow moves to block 735, otherwise flow moves to block 715 where the self test module 250 starts a CCID fault test timer (e.g., 50 msec timer). Flow then moves to block 720 where the self test module 250 asserts the CCID fault test signal 166A to the CCID circuitry 138, and flow moves to block 725.

At block 725, the self test module 250 determines whether a CCID fault condition exists. Assuming that a corresponding CCID fault test signal 166B is asserted by the processor 130B, the CCID fault test signals 166A-B should generate a differential current (e.g., the CCID test loop 180) that triggers a CCID fault. The CCID sense 182 indicates the amount of differential current and if the amount exceeds a threshold (thus a CCID fault condition exists), the CCID circuitry 138 outputs a signal to the processors 130A-B (the CCID fault signal 168). If such a CCID fault condition exists, then flow moves to block 75. If a CCID fault condition does not exist (e.g., as indicated by the CCID fault signal not being asserted by the CCID circuitry 138), then flow moves to block 730.

At block 730, the self test module 250 determines whether the CCID fault test timer has expired. Flow moves back to block 725 if the CCID fault test timer is not expired, otherwise flow moves to block 735 where the self test module 250 de-asserts the CCID fault test signal. From block 735, flow moves to block 740 where the self test module 250, using the set status subroutine 280, sets the status of the SSM 120 as Failed Self Test, ON (which indicates that the self test failed and the evident indicator is on). Flow then moves to block 745 where the SSM 120 is halted, which requires a power cycle to reset the SSM 120. Thus, if a CCID fault is not asserted to the processor 130A within the time established by the CCID fault test timer (e.g., 50 msec), then the status of the SSM 120 will be set as Failed Self Test, ON, which indicates that the self test failed and the evident indicator should be turned on, and the SSM 120 is halted.

Referring back to 725, if a CCID fault condition exists (in response to the CCID fault test signal being asserted), then flow moves to block 750, where the self test module 250 starts a CCID fault test timer (e.g., 50 msec). Flow moves from block 750 to block 755, where the self test module 250 de-asserts the CCID fault test signal 166A, and flow moves to block 760. It should be understood that responsive to the CCID fault test signal 166A being de-asserted, the CCID circuitry 138 should stop generating a differential current and the CCID fault should be cleared (that is, the CCID circuit 138 should de-assert the CCID fault signal 168, if operating correctly).

At block 760, the self test module 250 determines whether the CCID fault test timer has expired. If it has expired, then flow moves to block 765, where the self test module 250 determines whether a CCID fault condition exists. If a CCID fault condition exists (e.g., the CCID fault signal 168 is being asserted), then flow moves to block 740; otherwise flow moves to block 770, where the charge module 260 is called to execute.

In some embodiments, the self test module 250 does not de-assert the relay enable signal 162A to cause the contactor control circuitry 134 to de-energize the relay to open the contacts responsive to the CCID fault signal 168 being asserted, since at this point in the flow the contacts are already open (as confirmed by the operation described in reference to block 320 of FIG. 3). Thus in this embodiment, the SSM 120 does not respond to an asserted CCID fault signal 168 by de-asserting the relay enable signal 162A when in the IDLE state. It should be understood that while the SSM 120 is in the Charging state, the SSM 120 responds to an asserted CCID fault signal 168 by de-asserting the relay enable signal 162A.

Figure 8:
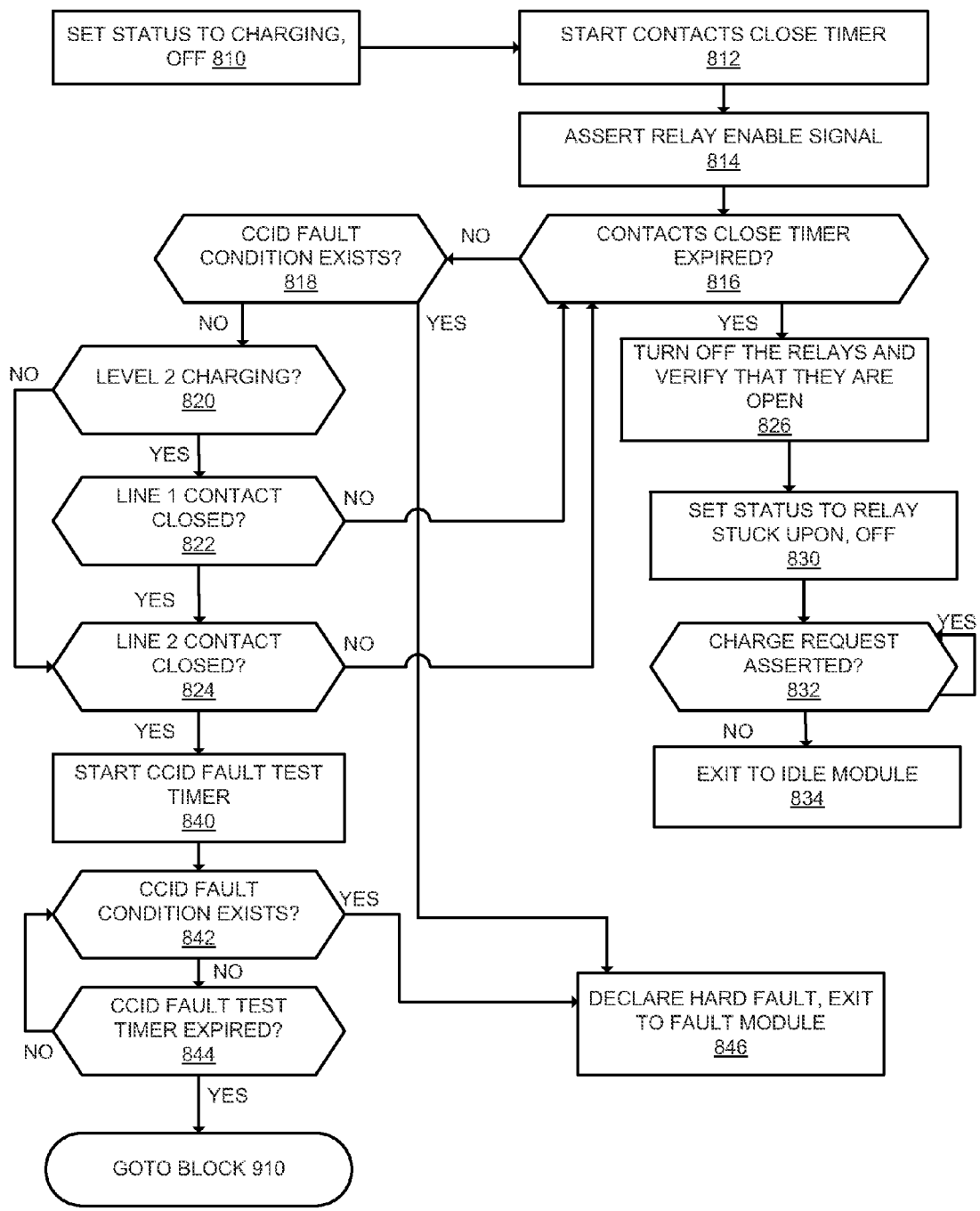
FIGS. 8 and 9 are flow diagrams illustrating exemplary operations performed by the charge module of the SSM according to one embodiment of the invention.
Figure 9:
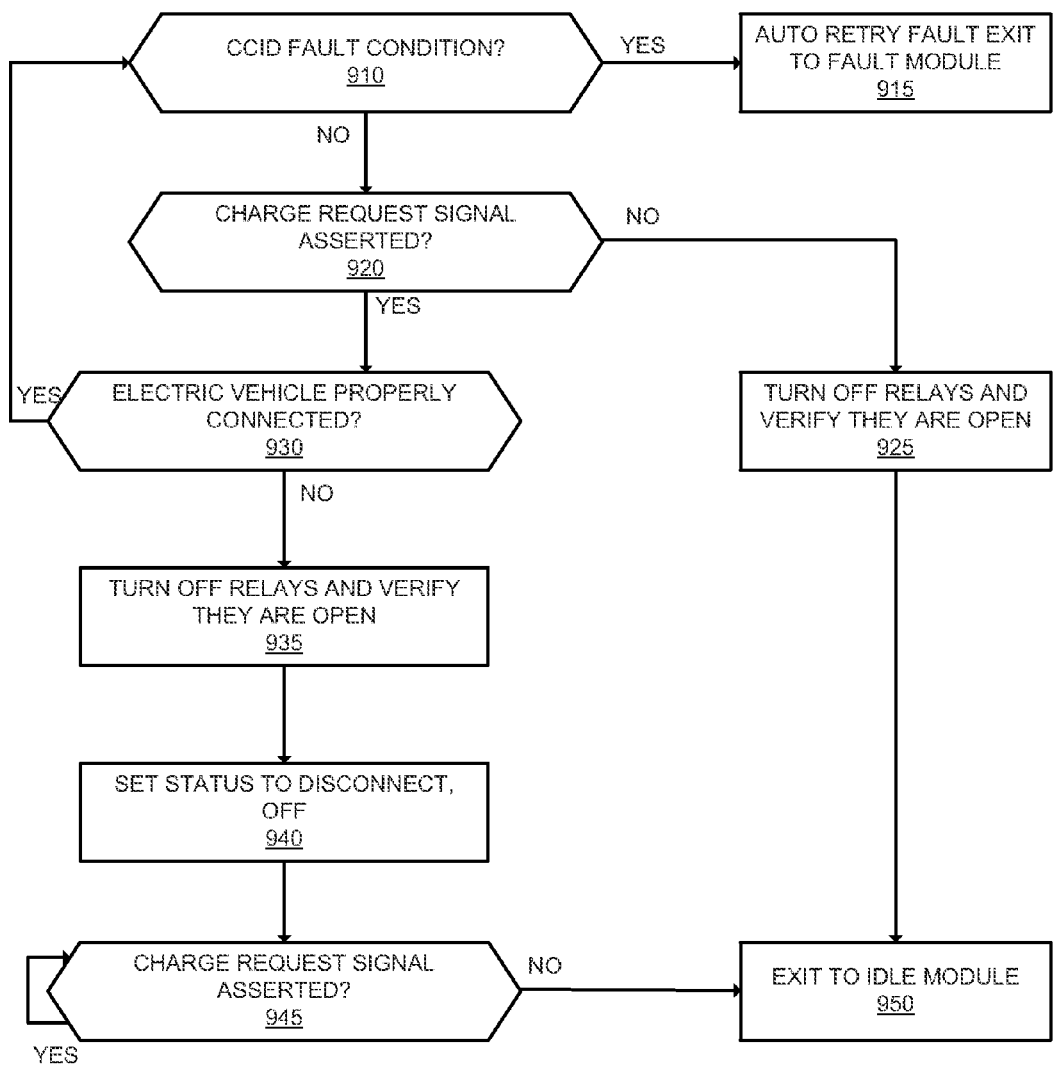

FIGS. 8 and 9 are flow diagrams illustrating exemplary operations performed by the charge module 260 according to one embodiment of the invention. At block 810, the charge module 260, with use of the set status subroutine 280, sets the status of the SSM 120 to Charging, OFF, which indicates that the charging is currently allowed and the evident indicator should be off. Flow moves from block 810 to block 812, where the charge module 260 starts a contacts close timer (e.g., 200 msec timer). Flow then moves to block 814, where the charge module 260 asserts the relay enable signal 162A to the contactor control circuitry 134. As previously described, the relay enable signal 162A is asserted to cause the contactor control circuitry 134 to close the contacts of the relay 125 to allow energy to flow between the electric vehicle and the charging station. Flow moves from block 814 to block 816, where the charge module 260 determines whether the contacts close timer has expired. If the contacts close timer has expired (thus the contacts have not been closed prior to expiration of the contacts close timer), then flow moves to block 826; otherwise flow moves to block 818.

At block 818, the charge module 260 determines whether a CCID fault condition exists. For example, a CCID fault condition exists if the CCID fault signal 168 is being asserted. Flow moves to block 846 if a CCID fault condition exists, where a hard fault is declared and the charge module 260 exits to the fault module 240, which is described in greater detail with reference to FIG. 12. If a CCID fault condition does not exist, flow moves to block 820, where the charge module 260 determines whether level two charging is requested. For example, the charge module 260 analyzes the processor mode signal 156 to determine whether level two charging is requested (or level one charging is requested) (e.g., if the processor mode signal 156 is low then it is level one charging and if the processor mode signal 156 is high then it is level two charging). If level two charging is not requested, then flow moves to block 824; otherwise flow moves to block 822.

At block 822, the charge module 260 determines whether the contact for switched line 176 is closed. For example, the charge module 260 analyzes the relay detect signal 164 to determine whether the contact for the switched line 176 is open (e.g., if the relay detect signal 164 is low, then the contact for the switched line 176 is closed). If the contact is not closed, then flow moves back to block 816, otherwise flow moves to block 824.

At block 824, the charge module 260 determines whether the contact for switched line 178 is closed. For example, the charge module 260 analyzes the relay detect signal 165 to determine whether the contact for the switched line 178 is open (e.g., if the relay detect signal 165 is low, then the contact for the switched line 176 is closed). If the contact is not closed, then flow moves back to block 816, otherwise flow moves to block 840.

The SSM 120 does not perform an automatic retry in response to a quick fault which occurs when a CCID fault is detected substantially immediately after closing the contacts (e.g., within 50 milliseconds of closing the fault). Thus after the contacts have been closed, the charge module 260 starts a CCID fault test timer (e.g., 50 msec timer) at block 840. Flow then moves to block 842 where the charge module 260 determines if a CCID fault condition exists (e.g., by analyzing the CCID fault signal 168). For example, a CCID fault condition exists if the CCID fault signal 168 is asserted. Flow moves to block 846 if a CCID fault condition exists (a quick fault has occurred) and the charge module 260 exits to the fault module 240 to handle a hard fault. Flow moves to block 844 if a CCID fault condition does not exist and the charge module 260 determines whether the CCID fault test timer has expired. If the CCID fault test timer has not expired, then flow moves back to block 842; otherwise flow moves to block 910 of FIG. 9.

Referring back to block 816, if the contacts close timer has expired (prior to the contacts closing), then flow moves to block 826. At block 826, the charge module 260 turns off the relays and verifies that they are open. For example, the charge module 260 calls the turn off subroutine 270 (illustrated in FIG. 4) with the intention of opening the contacts (if not already open) and verifying that they are open. After verifying that the contacts are open, flow moves to block 830 where the charge module 260, with use of the set status subroutine 280, sets the status of the SSM 120 to Relay Stuck Open, OFF, which indicates that the relay contacts are stuck open and the evident indicator should be off. It should be understood that if the relays are stuck open, no current will be able to flow between the charging station and an electric vehicle. Flow moves from block 830 to block 832.

At block 832, the charge module 260 determines whether the charge request signal 152 is being asserted. Flow remains at block 832 if a charge request is being asserted. If a charge request is de-asserted, then flow moves to block 834 where the charge module 260 exits to the idle module 230.

Referring to FIG. 9, at block 910, the charge module 260 determines whether a CCID fault condition exists. For example, if the CCID fault signal 168 is currently being asserted to the processor 130A from the CCID circuitry 138, then a CCID fault condition exists. If a CCID fault condition exists, then flow moves to block 915, otherwise flow moves to block 920. At block 915, an auto-retry fault is declared and the charge module 260 exits to the fault module 240. The auto-retry fault occurs when a CCID fault occurs after the relays have been on for at least a threshold amount of time (e.g., 50 milliseconds). The auto-retry fault is eligible for an automatic retry for a number of times in a session.

At block 920, the charge module 260 determines whether the charge request signal 152 is being asserted. Flow moves to block 930 if the charge request signal 152 is being asserted. If the charge request 152 is de-asserted, then flow moves to block 925, where the charge module 260 calls the Turn Off subroutine 270, which opens the relay contacts (if not already open) and verifies that they are open. Flow moves from block 925 to block 950 where the charge module 260 exits to the idle module 230.

At block 930, the charge module 260 determines whether an electric vehicle is properly connected to the charging station. In one embodiment, the charge module 260 calls the vehicle detect subroutine 275, described in FIG. 6, to determine whether an electric vehicle is properly connected to the charging station. Flow moves from block 930 back to block 910 if an electric vehicle is properly connected; otherwise flow moves to block 935.

At block 935, the charge module 260 calls the Turn Off subroutine 270 in a similar way as described with reference to block 925. Flow then moves to block 940, where the charge module 260 sets the status of the SSM 120 to electric vehicle disconnect, and Off, which indicates that the electric vehicle is disconnected from the charging station and the evident indicator is off. Flow moves from block 940 to block 945, where the charge module 260 determines whether the charge request signal 152 is being asserted. Flow stays at block 945 if the charge request signal 152 is being asserted and moves to block 950 and exits to the idle module 230 otherwise.

It should be understood that the SSM 120 only allows current to flow between the power supply and the electric vehicle while a CCID fault condition is not experienced, the charge request signal is asserted, and the electric vehicle is properly connected to the charging station. Thus, if a CCID fault condition exists (which can be detected by one or both of the processors 130A-B), if the charge request signal 152 is de-asserted, or if the electric vehicle becomes disconnected from the charging station (e.g., the electric vehicle operator has unplugged the charging cord from the electric vehicle and/or has unplugged the charging cord from the charging station), the relay contacts are opened to prevent current from flowing through the charging station to the electric vehicle.

Figure 10:
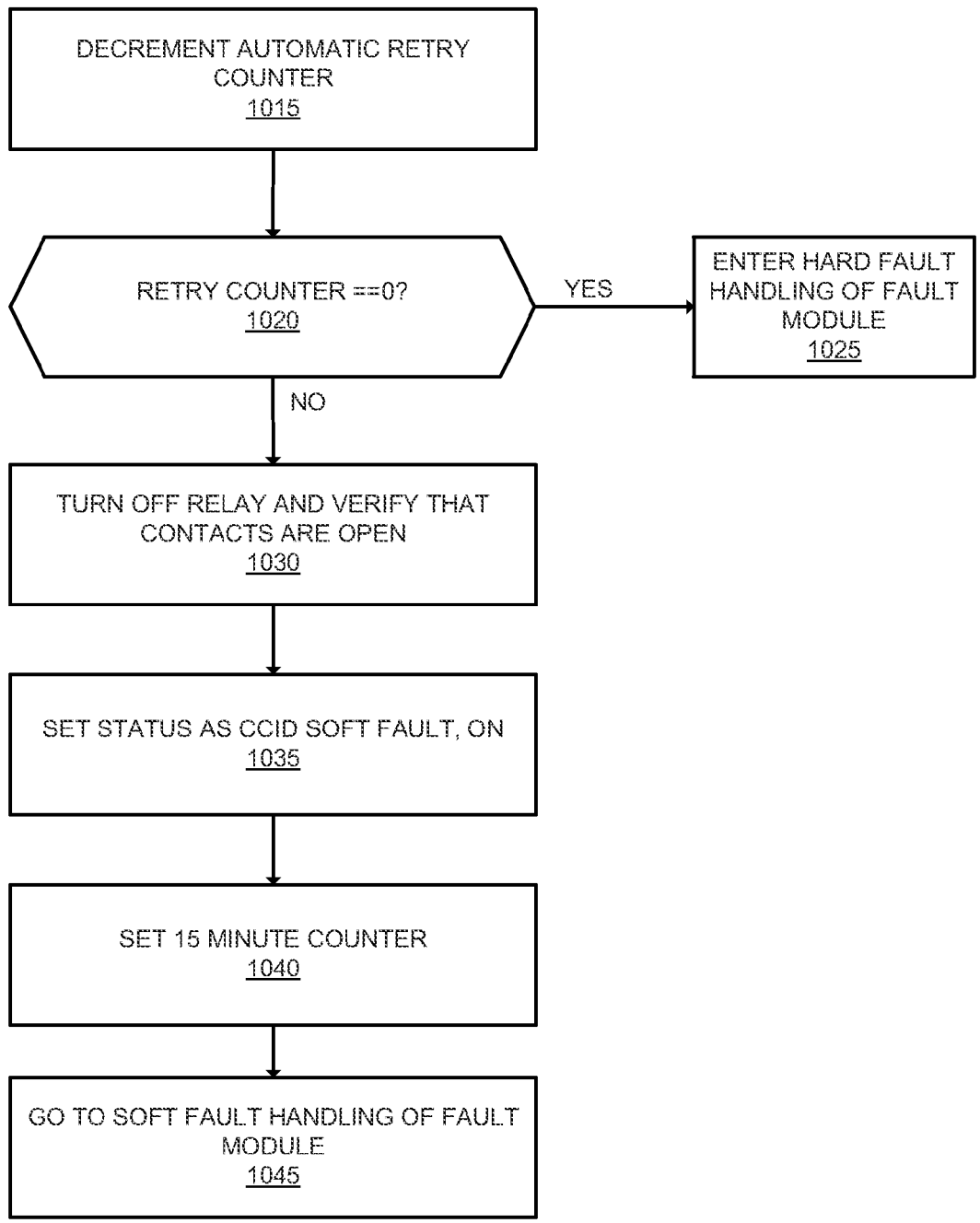
FIG. 10 is a flow diagram illustrating exemplary operations performed by the fault module of the SSM when responding to an auto-retry fault according to one embodiment of the invention.

FIG. 10 is a flow diagram illustrating exemplary operations performed by the fault module 240 when responding to an auto-retry fault according to one embodiment. The SSM 120 may allow for an automatic retry a number of times (e.g., it may not perform more than three automatic retries). At block 1015, the fault module 240 decrements the automatic retry counter. Flow then moves to block 1020, where the fault module 240 determines whether the retry counter is equal to zero. If it is equal to zero, then flow moves to block 1025 and the fault module 240 enters its hard fault handling, which will be described in greater detail with respect to FIG. 12. If the retry counter is greater than zero, then flow moves to block 1030.

At block 1030, the fault module 240 turns off the relays and verifies that they are open. For example, the fault module 240 calls the Turn Off subroutine 270 (whose exemplary operations are illustrated in FIG. 4) with the intention of opening the contacts (if not already open) and verifying that they are open. After verifying that the contacts are open, flow moves to block 1035, where the fault module 240, with use of the Set Status subroutine 280, sets the status of the SSM 120 to CCID Soft Fault, ON, which indicates that there is a CCID soft fault and the evident indicator is on. Flow moves to block 1040 where the fault module 240 sets an automatic retry timer (e.g., set for 15 minutes) and an evident indicator blink timer (e.g., set for one second). Next, at block 1045, the fault module 240 exits to the soft fault handling portion of the fault module 240, which is described in greater detail with reference to FIG. 11.

Figure 11:
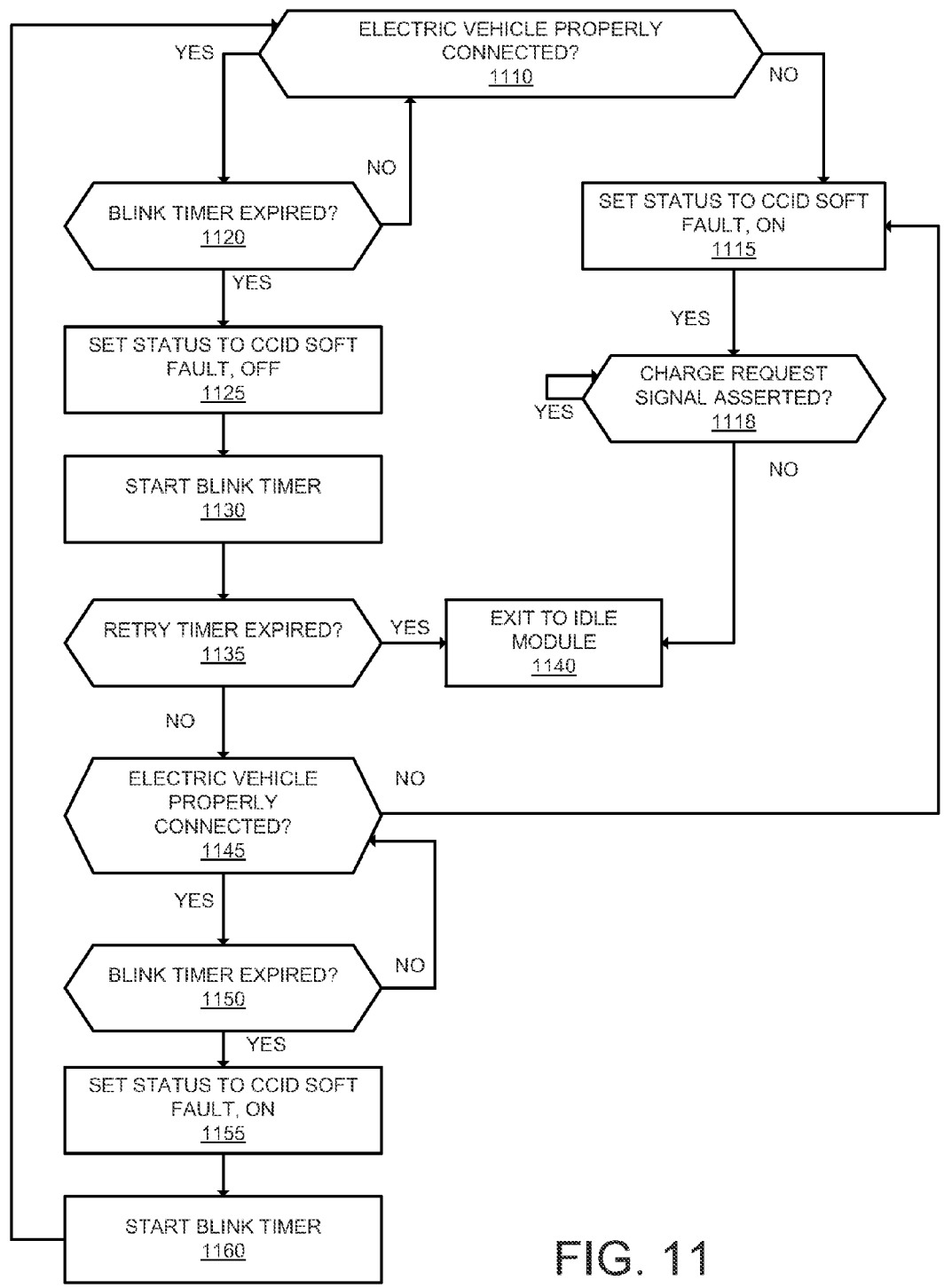
FIG. 11 is a flow diagram illustrating exemplary operations performed by the fault module of the SSM when responding to a soft fault according to one embodiment of the invention.

FIG. 11 is a flow diagram illustrating exemplary operations performed by the fault module 240 when responding to a soft fault according to one embodiment. At block 1110, the fault module 240 determines whether an electric vehicle is properly connected to the charging station. In one embodiment, the fault module 240 calls the vehicle detect subroutine 275, described in FIG. 6, to determine whether an electric vehicle is properly connected to the charging station. Flow moves from block 1110 to block 1120 if an electric vehicle is properly connected; otherwise flow moves to block 1115. At block 1115 (an electric vehicle is not properly connected), the fault module 240, using the set status subroutine 280, sets the status of the SSM 120 to CCID soft fault, and ON. Flow moves from block 1115 to block 1118 where the fault module 240 determines whether the charge request signal 152 is asserted. Flow remains at block 1118 if the charge request signal 152 is asserted and flow moves to block 1140 otherwise.

At block 1120 (an electric vehicle is properly connected to the charging station), the fault module 240 determines whether the evident indicator blink timer has expired (the evident indicator blink timer set in block 1040). If the blink timer has not expired, then flow moves back to block 1110, otherwise flow moves to block 1125, where the fault module 240, using the set status subroutine 280, sets the status of the SSM 120 to CCID soft fault, OFF, which indicates that there is a CCID fault and the evident indicator should not be illuminated. Flow moves from block 1125 to block 1130, where the fault module 240 starts the evident indicator blink timer (e.g., sets it to expire in one second). Flow then moves to block 1135.

At block 1135, the fault module 240 determines whether the retry timer has expired (the automatic retry will occur sometime after the retry timer has expired). If the retry timer is expired, then flow moves to block 1140 where the fault module 240 exits to the idle module 230 (e.g., flow moves to block 510 of FIG. 5). If the retry timer is not expired, then flow moves to block 1145, where the fault module 240 determines whether an electric vehicle is properly connected to the charging station (in a similar way as described with reference to block 1110). If an electric vehicle is properly connected, then at block 1150 the fault module 240 determines whether the evident indicator blink timer has expired. If it has not expired, flow moves back to block 1145. If it is expired, flow moves to block 1155 and the fault module 240, using the set status subroutine 280, sets the status of the SSM 120 to CCID soft fault, and ON. Thus it should be understood that by changing the state of the evident indicator (switching between off and on), the evident indicator will blink and serves as an indication that an automatic retry will be performed. Flow moves from block 1155 to block 1160 where the fault module 240 resets the evident indicator blink timer.

Figure 12:
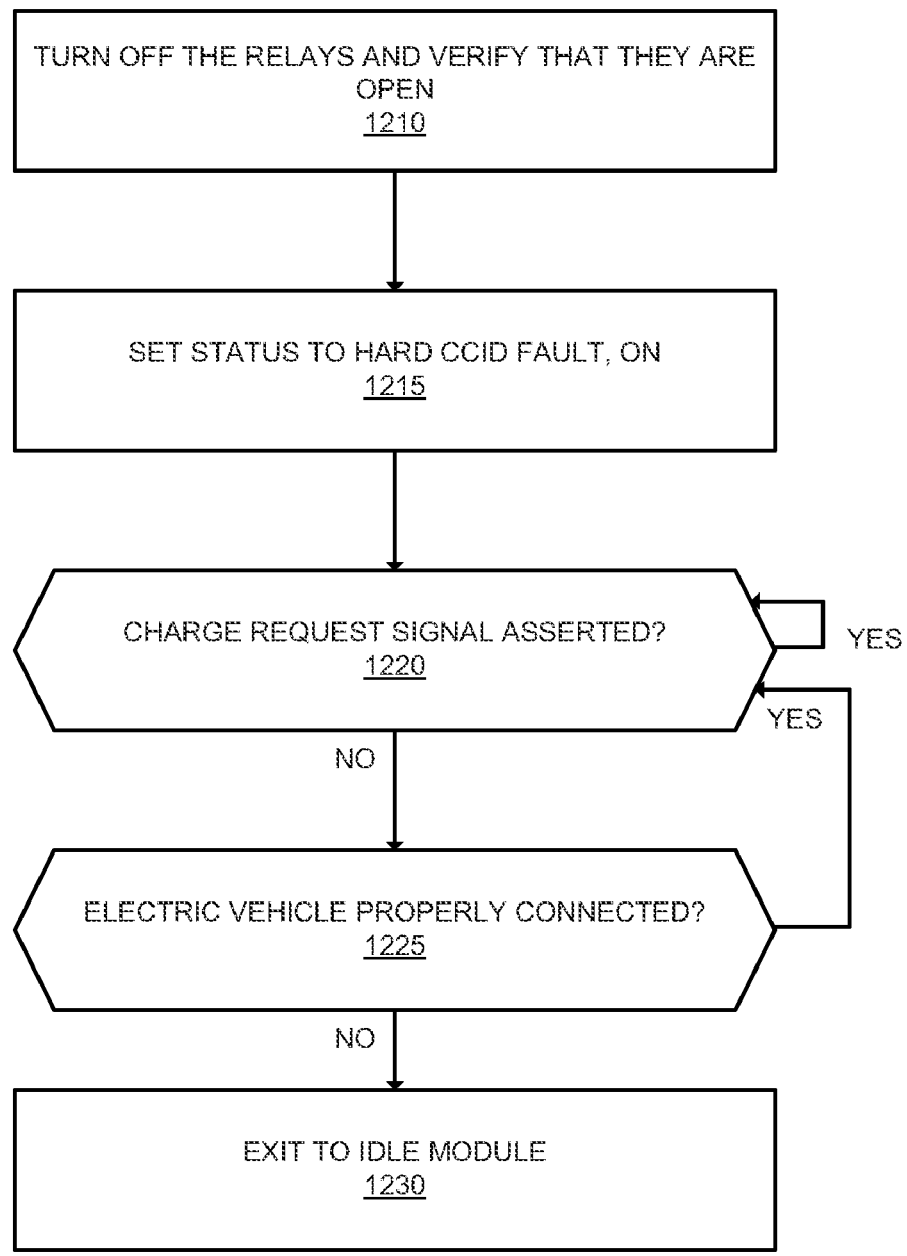
FIG. 12 illustrates exemplary operations performed by the fault module of the SSM when responding to a hard fault according to one embodiment of the invention.

FIG. 12 illustrates exemplary operations performed by the fault module 240 when responding to a hard fault according to one embodiment. At block 1210, the fault module 240 causes the relays to be turned off (the contacts to be open) and verifies that they are open. For example, the fault module 240 calls the turn off subroutine 270 which is described with reference to FIG. 4. Flow moves from block 1210 to block 1215, where the fault module 240 sets the status of the SSM 120 as hard CCID fault and ON, which indicates that there is a hard CCID fault (one in which automatic retry cannot be performed) and that the event indicator should be illuminated. Flow next moves to block 1220, where the fault module 240 determines whether the charge request signal 152 is asserted. Flow remains at block 1220 if the charge request signal 152 is asserted and flow moves to block 1225 otherwise. At block 1225, the fault module 240 determines whether an electric vehicle is properly connected to the charging station (e.g., by calling the vehicle detect subroutine 275 described in FIG. 6). If an electric vehicle is properly connected, then flow moves back to block 1220, otherwise flow moves to block 1230 where the fault module 240 exits to the idle module 230.

Figure 13:
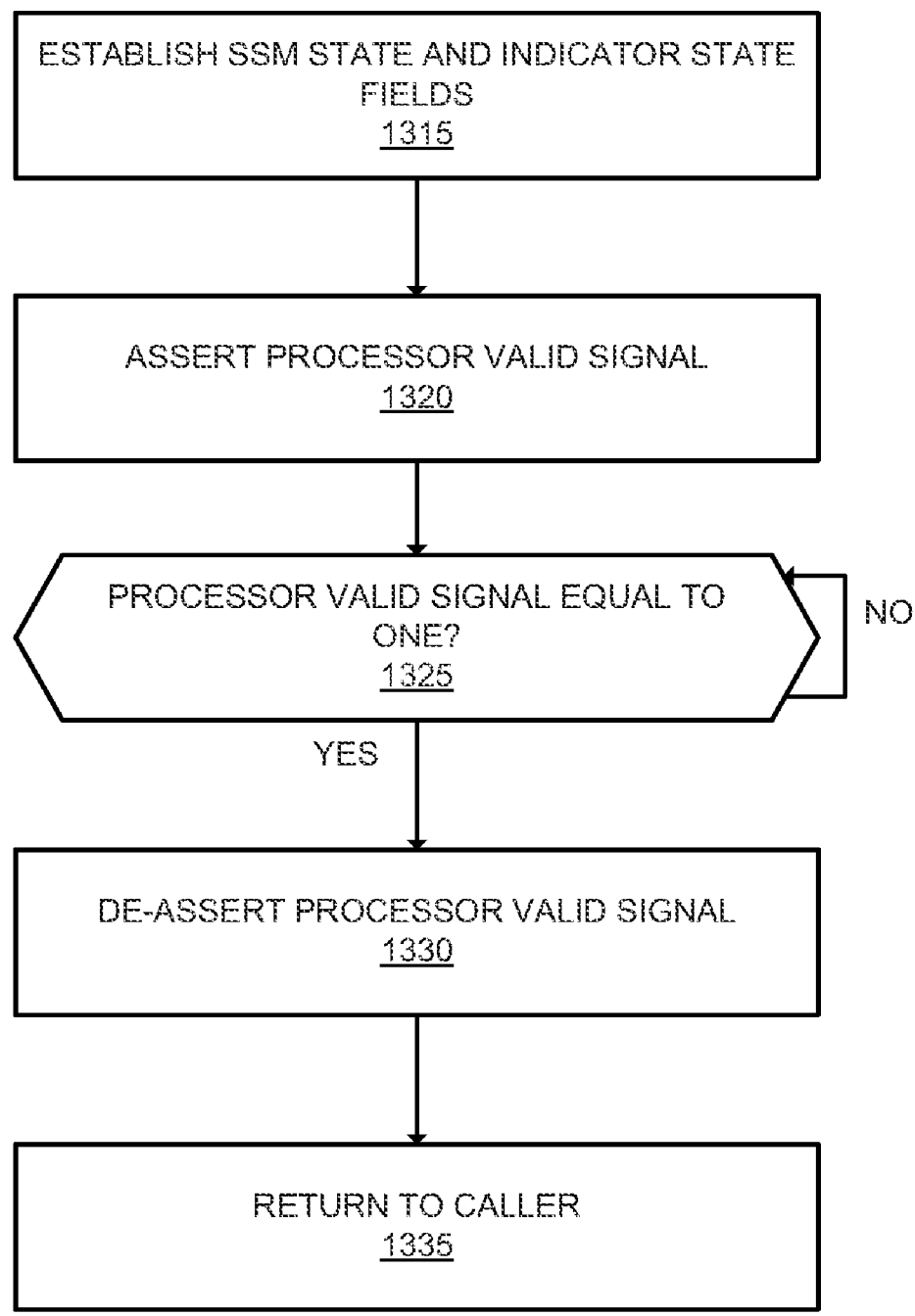
FIG. 13 illustrates exemplary operations of the set status subroutine of the SSM according to one embodiment of the invention.

FIG. 13 illustrates exemplary operations of the set status subroutine 280 according to one embodiment. The operations begin at block 1315 where the set status subroutine 280 establishes the status of the SSM 120 and the evident indicator according to the calling module or subroutine. For example, the calling module or subroutine passes the values of the SSM 120 state (e.g., boot, idle, charging, relay stuck open, relay stuck closed, CCID self test fail, CCID soft fault, CCID hard fault, electric vehicle disconnect, etc.) to the set status subroutine 280. Flow moves from block 1315 to block 1320.

The processors 130A-B do not exchange data. However, occasionally the processors 130A-B synchronize their operations. In one embodiment, synchronization is performed through use of the processor valid signal 159, which will be asserted through use of the set status subroutine 280. The processor valid signals are connected in a wired-AND function such that the signal remains low until both of the processors 130A-B assert the processor valid signal 159. Thus, if one processor detects that the processor valid signal 159 is high, it knows that the other processor has reached a synchronization point and has asserted a processor valid signal 159.

At block 1320, the set status subroutine 280 causes the processor 130A to assert the processor valid signal 159. Flow moves from block 1320 to block 1325, where the set status subroutine 280 determines whether the processor valid signal 159 is equal to one (and thus the processor 130B has also reached a synchronization point and is asserting the processor valid signal 159). Flow remains at block 1325 until the signal is equivalent to one and flow moves to block 1330 when the signal is equivalent to one. At block 1330, the set status subroutine 280 causes the processor 130A to de-assert the processor valid signal 159. Flow then moves to block 1335 where the set status subroutine 280 returns to the calling module or subroutine.

In some embodiments, the SSM 120 may allow for a manual retry of the SSM 120. For example, after a CCID fault, an electric vehicle operator (e.g., the electric vehicle operator associated with the present charging session) or a charging station administrator or other service personnel, may manually cause the CCID fault to reset. In some embodiments, the manual retry of the SSM 120 requires that the electric vehicle be disconnected (e.g., removal of a charging cord from the electric vehicle and/or the charging station) and reconnected (e.g., plugging the charging cord into the electric vehicle and/or the charging station) and the electric vehicle operator to re-authorize (or service personnel or other administrator to request a manual retry). For example, in embodiments where an electric vehicle operator swipes an RFID smartcard to request charging service (which caused the host system to generate the charge request signal 152 once determining that the request is authorized), the same RFID smartcard (or an administrator RFID smartcard and/or identifier) is used to request a manual retry of the SSM 120 (after the electric vehicle is disconnected and reconnected). Thus, if a different RFID smartcard is used (or one that is not authorized), the manual retry procedure will not be successful. Thus, for level one charging, the SSM 120 will attempt a manual retry when the door sense signal 154 is de-asserted then asserted and the charge request signal 152 is de-asserted then asserted. In level two charging, the SSM 120 will attempt a manual retry when the pilot detect signal 160 is de-asserted then asserted and the charge request signal 152 is de-asserted then asserted.

FIG. 14 is a schematic of exemplary circuitry for the pilot conditioning circuitry 136 according to one embodiment. The non-inverting input of the op-amp 1420 is the PI+Input signal 158 from the host system 110. The inverting input of the op-amp 1420 is the output of the op-amp 1420. The output of the op-amp 1420 is filtered through use of the capacitor 1430 to generate the pilot detect signal 160 (PL+Detect). This converts the pilot input signal 158 into a form suitable for use by the processors 130A-B. Of course, it should be understood that FIG. 14 is one example of conditioning or converting the pilot input signal 158 into a form suitable for the processors 130A-B, and other, different circuitry may be used in different embodiments.

Figure 15:
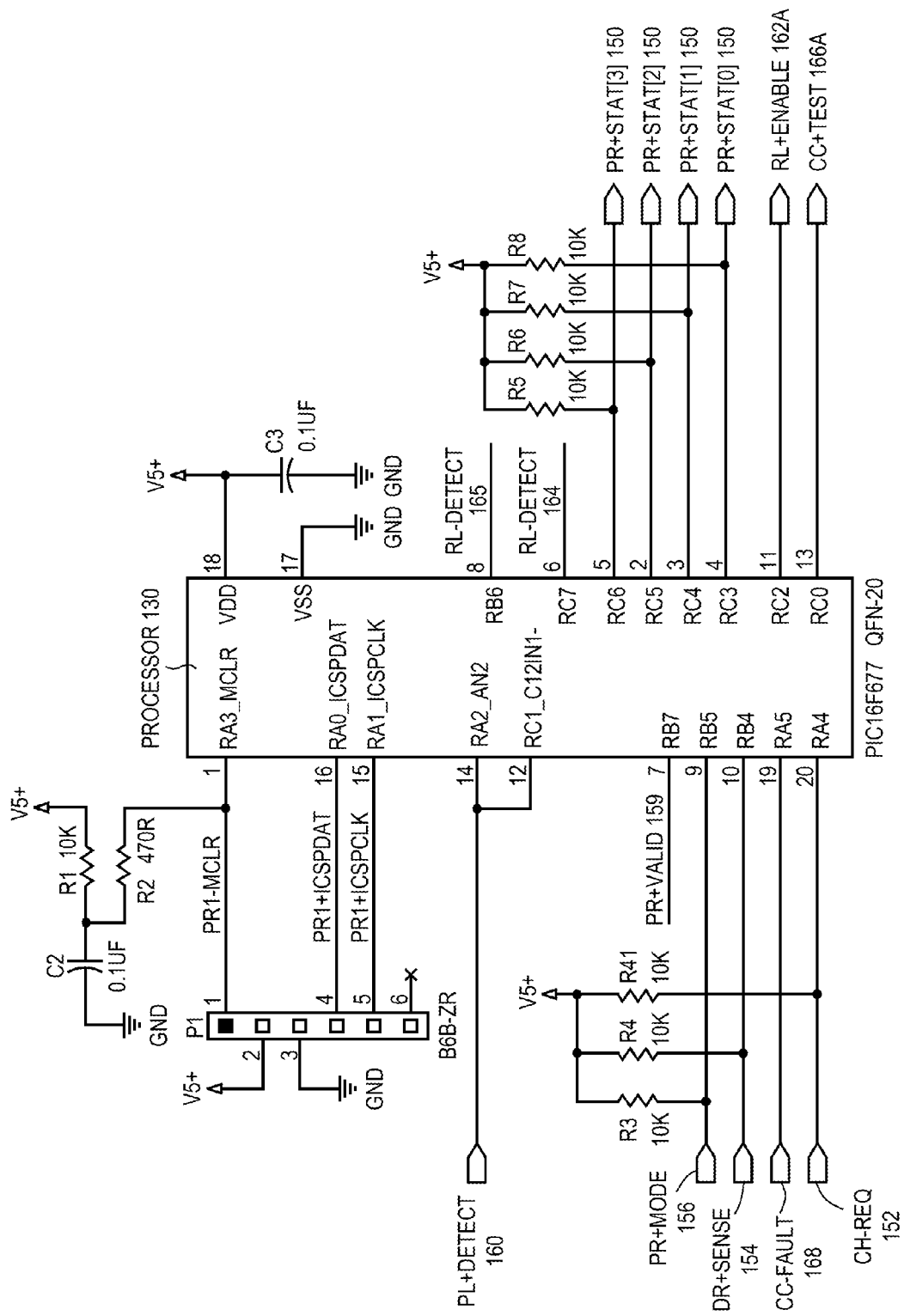
FIGS. 15 and 16 are schematics illustrating exemplary signals received and generated by the processors of the SSM according to one embodiment of the invention.
Figure 16:
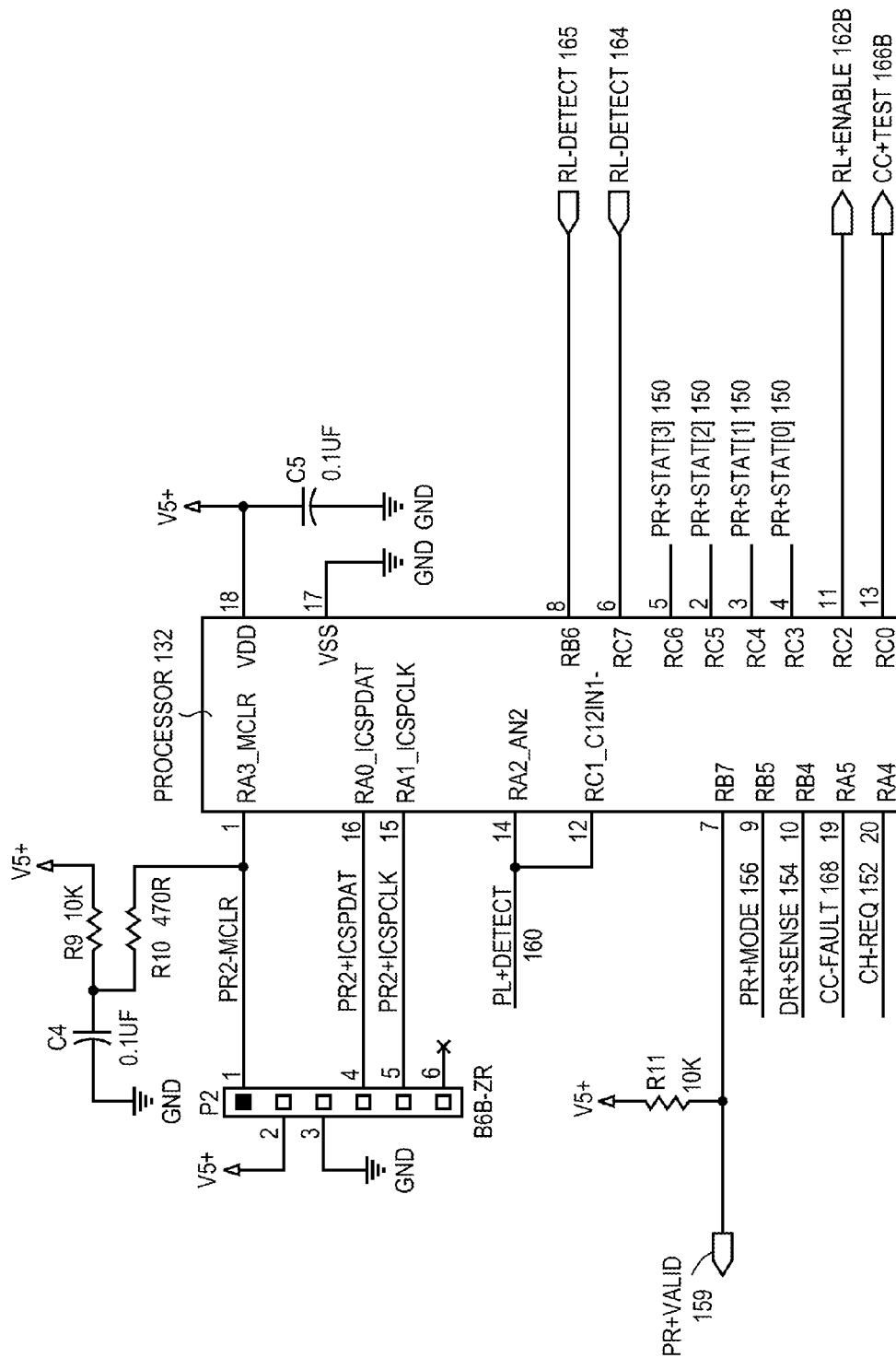

FIGS. 15 and 16 are schematics illustrating exemplary signals received and generated by the processors 130A-B according to one embodiment. As illustrated in FIGS. 15 and 16, the processors 130A-B are each twenty pin PIC processors. As previously described, the processors 130A-B are redundant processors. Pin 1 (master clear) is used to clear or reset the processor. For example, when a processor is halted, the processor may be reset through use of the master clear function. Pin 18 provides connection to positive voltage and pin 17 is connected to ground. Pin 16 is used for transferring ICPS (In-Circuit Serial Programming) data to the processor while pin 15 is used for the clock for ICPS. Pins 12 and 14 are used for the pilot detect signal 160, where pin 12 is used as a comparator and pin 14 is used for the analog to digital input pin. Pins 2-5 are used for the processor status signals[0:3] 150 (output to the host system 110), pins 6 and 8 are used for the relay detect signals 164 and 165 respectively (input from the contactor control circuitry 134), pin 7 is used for the processor valid signal 159 (output to the host system 110), pin 9 is used for the processor mode signal 156 (input from the host system 110), pin 10 is used for the door sense signal 154 (input from the host system 110), pin 11 is used for the relay enable signal 162A or 162B (output to the contactor control circuitry 134), pin 13 is used for the CCID fault test signal 166A or 166B (output to the CCID circuitry 138), pin 19 is used for the CCID fault signal 168 (input from the CCID circuitry 138), and pin 20 is used for the charge request signal 152 (input from the host system 110).

Figure 17C:
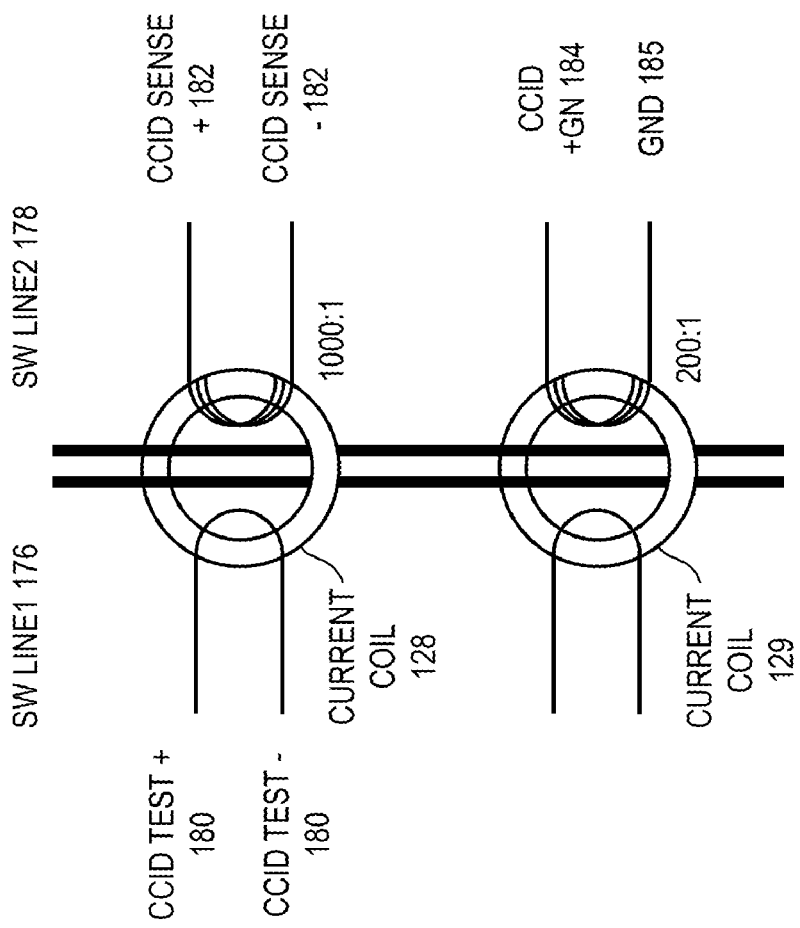

FIG. 17A is a schematic illustrating exemplary circuitry of the CCID circuitry 134 used to generate a test current to trigger a CCID fault during a self test according to one embodiment. The CCID test signals 166A and 166B are input from the processors 130A-B respectively. The CCID test signals 166A and 166B, when asserted, respectively close a switch in the CCID self test switch 1715 and the CCID test switch 1720 causing a low voltage current loop (CCID test 180) that has a differential current sufficient to trigger a CCID fault detection. It should be understood that both of the CCID signals 166A and 166B need to be asserted in order to generate the low voltage current loop. That is, if either of the 166A and 166B are not asserted, the self test will fail due to the CCID circuitry 134 not generating the CCID test 180. The CCID test loop connects to the CCID connector 1725. As illustrated in FIG. 17C, the CCID test loop 180 induces current in the current coil 128 when the CCID test signals 166A-B are asserted.

FIG. 17B is a schematic illustrating exemplary circuitry of the CCID circuitry 134 used to detect a CCID fault and generate a drive signal to detect a grounded neutral fault according to one embodiment. The CCID fault detect circuitry 1750 measures the differential current that exists in the switched lines 176 and 178. For example, with reference to FIG. 17C, the switched lines 176 and 178 run through the current coils 128. When there is a current imbalance between the switched lines 176 and 178 (there is differential current), then some amount of current begins to flow in the current coil 128. The CCID sense 182 is an analog input to the CCID circuitry 134 that is used to determine the amount of differential current present in the two conductors (if any) (the CCID sense loop 182 is connected to the CCID connector 1725). If the amount of differential circuit exceeds a threshold (e.g., 20 mA), the CCID circuitry 138 outputs the CCID fault signal 168 to the processors 130A-B. The positive side of the CCID sense signal 182 flows through the capacitors C8 and C9, and the negative side of the CCID sense signal 182 flows through the capacitors C10 and C11 to filter noise from the current coil 128. The diodes D5 and D6 are protection diodes to limit the current in the op-amps 1730A-E. The op-amps 1730A-D are used to detect differential current between the switched lines 176 and 178. If there is not a sufficient amount of current differential (e.g., the current is balanced between the switched lines 176 and 178), the CCID fault signal 168 will be low. If there is sufficient current differential, the CCID fault signal 168 will be high.

As illustrated in FIG. 17B, the CCID circuitry 134 also includes the CCID grounded-neutral drive circuit 1760 to generate a drive signal (e.g., CCID+GN 184) that induces equal current on the switched lines 176 and 178 passing through the current coil 129. If there is a neutral-ground short, current will flow through the neutral line to the ground 185, which will lead to current flowing back to the neutral line causing a current imbalance between the neutral and hot lines (the switched lines 176 and 178), which will be detected by the CCID fault detect circuitry 1750 and the CCID fault signal 168 will be high. Thus, by inducing a current onto the switched lines 176 and 178 through the generated drive signal, a neutral-ground fault (which will cause differential current) will be detected through the coil 128. It should be understood that the CCID+GN 184 drive signal is asserted only when the contacts for the switched lines 176 and 178 are closed.

FIG. 18A is a schematic illustrating exemplary circuitry of the contactor control circuitry 134 used to generate a high voltage AC current loop used to energize the relay 125 to close the contacts of the switched lines 176 and 178. The relay enable signals 162A and 162B, when asserted, cause the LED in the optocouplers 1815A and 1815B to illuminate causing the generation of the switched coil outputs 170 and 174 respectively to create a high voltage current loop to control the relay 125. As illustrated in FIG. 18A, if either of the relay enable signals 162A-B are not asserted, the circuitry does not generate the high voltage current loop created by the switched coil outputs 170 and 174. The switched coil outputs 170 and 174 are connected to the contactor connector 1820.

FIG. 18B is a schematic illustrating exemplary circuitry of the contactor control circuitry 134 used to generate a low voltage current loop used to control a DC relay coil to close the contacts for the switched lines 176 and 178 according to one embodiment. The relay enable signals 162A and 162B, when asserted, cause the MOSFET switches 1845A and 1845B respectively to turn on, which generates the relay enable output 172 to drive a DC relay coil. If either of the relay enable signals 162A-B are not asserted, the circuitry does not generate the relay enable output 172.

FIG. 18C is a schematic illustrating exemplary circuitry of the contactor control circuitry 134 used to detect the position of the relay contacts (whether they are closed or open). The switched lines 176 and 178 are connected to the contactor connector 1820. The switched line 176 passes through the resistors R35 and R36 and then the diode D3 to the input of the optocoupler 1825. Similarly, the switched line 178 passes through the resistors R37 and R38 and then the diode D4 to the input of the optocoupler 1830. The capacitors C16 and C17 on the switched line 176, and the capacitors C18 and C19 on the switched line 178 are charged when the contacts are open. When the contact for the switched line 176 is closed and there is sufficient voltage on the line 176, the optocoupler 1825 operates and discharges the capacitors C16 and C17, which causes the relay detect signal 164 to go low (which indicates to the processors 130A-B that the contact for the switched line 176 is closed). Similarly, when the contact for the switched line 178 is closed and there is sufficient voltage on the line 178, the optocoupler 1830 operates and discharges the capacitors C18 and C19, which causes the relay detect signal 165 to go low (which indicates to the processors 130A-B that the contact for the switched line 178 is closed). If a relay detect signal is high, then the corresponding contact will be open. In some embodiments, there is only a single capacitor on the switched line 176 and on the switched line 178. It should be understood that to operate in level one charging or level two charging, the contacts for the switched lines 176 and 178 must be closed. However, in level one charging, the neutral contact is not sensed because there will not be sufficient voltage to cause the relay detect signal to be low. Thus, in level one charging, the relay detect signal corresponding to the neutral contact (e.g., the relay detect signal 164) is ignored.

Figure 19:
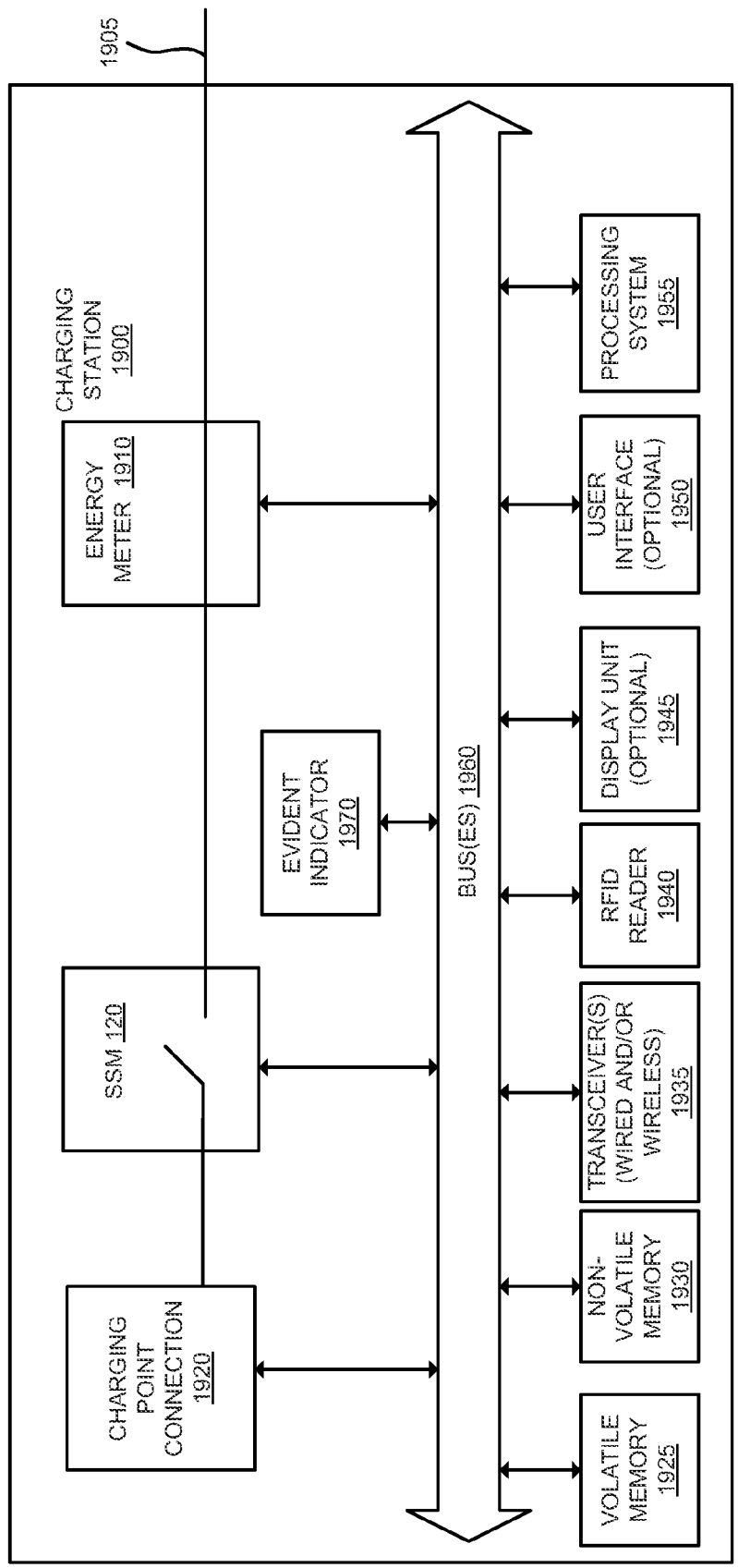
FIG. 19 is a block diagram illustrating an electric vehicle charging station according to one embodiment of the invention.

FIG. 19 illustrates an exemplary embodiment of a charging station according to one embodiment of the invention. It should be understood that FIG. 19 illustrates an exemplary architecture of a charging station, and other, different architectures may be used in embodiments of the invention described herein. As illustrated in FIG. 19, the charging station 1900 includes the energy meter 1910, the SSM 120, the charging point connection 1920, the volatile memory 1925, the non-volatile memory 1930 (e.g., hard drive, flash, PCM, etc.), one or more transceiver(s) 1935 (e.g., wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, etc.)), the RFID reader 1940, the display unit 1945 (which is optional), the user interface 1950 (which is optional), and the processing system 1955 (e.g., one or more microprocessors and/or a system on an integrated circuit), which are coupled with one or more buses 1960.

The energy meter 1910 measures the amount of electricity that is flowing on the power line 1905 through the charging point connection 1920. While in one embodiment of the invention the energy meter 1910 measures current flow, in an alternative embodiment of the invention the energy meter 1910 measures power draw. The energy meter 1910 may be an induction coil or other devices suitable for measuring electricity. In some embodiments, the energy meter 1910 is a programmable time of use energy meter.

The charging point connection 1920 is circuitry for a power receptacle (e.g., for level one charging) or circuitry for an attached charging cord (e.g., for level two charging) (e.g., with a SAE J1772 connector). The power receptacle can be any number of types of receptacles such as receptacles conforming to the NEMA (National Electrical Manufacturers Association) standards 5-15, 5-20, and 14-50 or other standards (e.g., BS 1363, CEE7, etc.) and may be operating at different voltages (e.g., 120V, 240V, 230V, etc.). The SSM 120 controls the current flowing on the power supply line(s) 1905 as described herein to energize and de-energize the charging point connection 1920.

The RFID reader 1940 reads RFID tags from RFID enabled devices (e.g., smartcards, key fobs, contactless credit cards, etc.), embedded with RFID tag(s) of operators that want to use the charging station 1900. For example, in some embodiments a vehicle operator can wave/swipe an RFID enabled device near the RFID reader 1930 to request charging service with the charging station 1900. It should be understood, however, that charging sessions may be requested in different ways and access identifiers may be presented to the charging station in different ways. For example, in some embodiments the electric vehicles communicate an access identifier (e.g., their VIN) to the charging station through a protocol (e.g., PLC). In such embodiments, the electric vehicle operator may not be required to present an access identifier (such as the RFID enabled device) to gain access to the charging station. However, it should be understood that the electric vehicle operators may use the RFID reader 1940 for payment.

The transceiver(s) 1935 transmit and receive messages. For example, the transceiver(s) 1935 may transmit authorization requests to a charging station network server for authorization (and receive corresponding authorization replies), transmit charging session data to the server for accounting, etc. The display unit 1945 is used to display messages to vehicle operators including the price(s) for charging service, current cost for charging service, charging status, confirmation messages, error messages, notification messages, etc. The display unit 1945 may also display parking information if the charging station 1900 is also acting as a parking meter (e.g., amount of time remaining in minutes, parking violation, etc.).

The user interface 1940 (which is optional) allows users to interact with the charging station 1900. By way of example, the user interface 1950 allows electric vehicle operators to request charging sessions, pay for charging sessions, enter in account and/or payment information, etc. The evident indicator 1970 illuminates when a CCID fault or other error occurs, as previously described.

The processing system 1955 may retrieve instruction(s) from the volatile memory 1925 and/or the nonvolatile memory 1930, and execute the instructions to perform operations as described above. For example, the processing system 1955 generates the charge request signal 152, the door sense signal 154 and the processor mode signal 156.

Some portions of the present invention may be implemented using code and data stored and executed on the charging station. The code and/or data may be stored in machine-readable media, such as machine-readable storage media (e.g., magnetic disks; optical disks; random access memory; read only memory; flash memory devices; phase-change memory) and/or machine-readable communication media (e.g., electrical, optical, acoustical or other form of propagated signals—such as carrier waves, infrared signals, digital signals, etc.). Thus, the storage device(s) of a given charging station typically stores code and/or data for execution on a set of one or more processors of that charging station. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A safety supervisory module of an electric vehicle charging station that controls flow of current from the electric vehicle charging station to an electric vehicle, comprising:
   a set of two or more processors to control operation of a contactor control circuitry to open and close a set of one or more contacts of a set of one or more power supply lines to control flow of current from the electric vehicle charging station to an electric vehicle, wherein each of the set of processors is to independently determine whether an unsafe condition exists and is to assert a relay enable signal to the contactor control circuitry only when an unsafe condition does not exist;
   the contactor control circuitry to:
      generate a current to energize a relay to close the set of contacts responsive to the relay enable signal being asserted by each and every processor of the set of processors, and
      inhibit closure of the set of contacts or open the set of contacts to prevent electricity from flowing between the electric vehicle charging station and an electric vehicle when any of the set of processors is not asserting the relay enable signal; and
   wherein each and every processor of the set of processors must be operating and asserting the relay enable signal for the set of contacts to be closed and any one or more processors of the set of processors are capable of inhibiting closure of the set of contacts and causing the set of contacts to open in the event of an unsafe condition.

2. The safety supervisory module of claim 1, further comprising:
   a charge circuit interrupt device (CCID) circuitry coupled with the set of two or more processors, the CCID circuitry to measure an amount of differential current existing in the set of one or more power supply lines and output a fault signal to the set of two or more processors indicating a fault responsive to an amount of differential current exceeding a threshold.

3. The safety supervisory module of claim 2, further comprising the CCID circuitry to, responsive to assertion of a CCID test signal from each of the set of processors, generate a self-test differential amount of current to verify that the CCID circuitry will output a fault signal to the set of two or more processors when a threshold amount of differential current exists.

4. The safety supervisory module of claim 3, further comprising the set of processors to assert the CCID test signal responsive to receipt of a signal from a host system that indicates a charging request and after determining that an electric vehicle is connected to the charging station.

5. The safety supervisory module of claim 4, wherein the set of processors are to assert the relay enable signal after verifying that the CCID circuitry will output a fault signal when a threshold amount of differential current exists.

6. The safety supervisory module of claim 1, further comprising the contactor control circuitry to output a signal to the set of two or more processors that indicates position of the set of one or more contacts.

7. The safety supervisory module of claim 1, further comprising the set of processors to output a set of one or more signals that indicate status of the safety supervisory module and to drive an evident indicator of the electric vehicle charging station.

8. The safety supervisory module of claim 1, further comprising a pilot conditioning circuitry coupled with the set of processors to convert an analog control pilot signal into a form suitable for use by the set of processors, wherein the analog control pilot signal indicates whether an electric vehicle is connected to the electric vehicle charging station and is ready to accept energy.

9. A method performed by a safety supervisory module of an electric vehicle charging station, comprising:
   receiving, at a first processor and second processor of the safety supervisory module, a charge request input that indicates a request to close a set of one or more contacts to allow current to flow between the electric vehicle charging station and an electric vehicle;
   responsive to the charge request input, the first and second processors each verifying that a charge circuit interrupting device (CCID) circuitry will generate a fault signal to the first and second processors respectively when a threshold amount of differential current exists through the one or more power supply lines;
   after verifying that the CCID circuitry will generate the fault signal, the first processor and second processor each asserting a signal to a contactor control circuitry to cause it to generate a current output to close the set of one or more contacts, wherein the contactor control circuit only generates the current output to close the set of one or more contacts when both of the first and second signals are asserted.

10. The method of claim 9, further comprising:
    prior to the first and second processors asserting the first and second signals to the contactor control circuit, each of the first and second processors to determine that an electric vehicle is connected to the electric vehicle charging station.

11. The method of claim 10, wherein the first and second processors determine that the electric vehicle is connected to the electric vehicle charging station by performing the following:
    determining a charging level by examining a charging level input signal from a host system; and
    based on the determined charging level, examining one of a door sense input signal used in a first charging level and a pilot detect signal used in a second charging level, wherein the door sense input signal indicates position of a locking door of the electric vehicle charging station, and wherein the pilot detect signal indicates an electric vehicle is connected and is ready to accept energy.

12. The method of claim 9, further comprising:
    responsive to either of the first and second processors receiving a fault signal from the CCID circuitry, that processor de-asserting the signal to the contactor control circuitry to cause it to stop generating current to open the set of one or more contacts.

13. The method of claim 9, further comprising:
the first and second processors starting a first and second automatic retry timer respectively; and
responsive to the first and second automatic retry timer expiring, the first and second processors each respectively asserting the signal to the contactor control circuitry to cause it to generate current to close the set of one or more contacts.

14. The method of claim 9, further comprising:
the first and second processors to output a set of one or more signals that indicate status of the safety supervisory module and to drive an evident indicator of the electric vehicle charging station.

15. An electric vehicle charging station, comprising:
a relay including a set of one or more contacts that closes the set of contacts when energized to allow current to flow through a set of one or more power supply lines and opens the set of contacts when de-energized to prevent current from flowing through the set of power supply lines; and
a safety supervisory module coupled with the relay that controls flow of current from the electric vehicle charging station to an electric vehicle, the safety supervisory module including:
a set of two or more processors to control operation of a contactor control circuitry that controls opening and closing of the set of one or more contacts in the relay to control flow of current from the electric vehicle charging station to an electric vehicle, and
the contactor control circuitry to generate a current to energize the relay to close the set of one or more contacts responsive to assertion of a relay enable signal from each of the set of processors and to de-energize the relay to open the set of one or more contacts responsive to one or more of the set of two or more processors de-asserting the relay enable signal.

16. The electric vehicle charging station of claim 15, further comprising the safety supervisory module including:
a charge circuit interrupt device (CCID) circuitry coupled with the set of processors, the CCID circuitry to measure an amount of differential current existing in the set power supply lines and output a fault signal to the set of two or more processors indicating a fault responsive to an amount of differential current exceeding a threshold.

17. The electric vehicle charging station of claim 16, further comprising the CCID circuitry to, responsive to assertion of a CCID test signal from each of the set of processors, generate a self-test differential amount of current to verify that the CCID circuitry will output a fault signal to the set of two or more processors when a threshold amount of differential current exists.

18. The electric vehicle charging station of claim 17, further comprising:
a host system to assert a charging request signal to the set of processors that indicates a request to close the set of contacts, and to assert one or more signals that indicate that an electric vehicle is connected to the electric vehicle charging station; and
wherein the set of processors are to assert the CCID test signal responsive to assertion of the charging request signal and the one or more signals that indicate that an electric vehicle is connected to the electric vehicle charging station.

19. The electric vehicle charging station of claim 18, wherein the set of processors are to assert the relay enable signal after verifying that the CCID circuitry will output a fault signal when a threshold amount of differential current exists.

20. The safety supervisory module of claim 18, further comprising the set of processors to output a set of one or more signals to the host system that indicate status of the safety supervisory module and to drive an evident indicator of the electric vehicle charging station.

21. The electric vehicle charging station of claim 15, further comprising the contactor control circuitry to output a signal to the set of two or more processors that indicates position of the set of one or more contacts.

22. The electric vehicle charging station of claim 15, further comprising the safety supervisory module to include a pilot conditioning circuitry coupled with the set of processors to convert an analog control pilot signal into a form suitable for use by the set of processors, wherein the analog control pilot signal indicates whether an electric vehicle is connected to the electric vehicle charging station and is ready to accept energy.

\* \* \* \* \*